(12) United States Patent
Brown et al.

(10) Patent No.: US 11,858,842 B2
(45) Date of Patent: Jan. 2, 2024

(54) OPTICAL FIBER BENDING MECHANISMS

(71) Applicant: NLIGHT, INC., Vancouver, WA (US)

(72) Inventors: Aaron Brown, Vancouver, WA (US); Aaron Ludwig Hodges, La Center, WA (US); Dahv A. V. Kliner, Portland, OR (US)

(73) Assignee: NLIGHT, INC., Camas, WA (US)

( * ) Notice: Subject to any disclaimer, the term of this patent is extended or adjusted under 35 U.S.C. 154(b) by 0 days.

(21) Appl. No.: 16/879,533

(22) Filed: May 20, 2020

(65) Prior Publication Data

US 2020/0354261 A1 Nov. 12, 2020

Related U.S. Application Data

(63) Continuation of application No. 15/938,959, filed on Mar. 28, 2018, now Pat. No. 10,730,785, which is a (Continued)

(51) Int. Cl.
    C03B 37/15 (2006.01)
    G02B 6/14 (2006.01)
    (Continued)

(52) U.S. Cl.
    CPC .............. *C03B 37/15* (2013.01); *C03B 40/00* (2013.01); *G02B 6/14* (2013.01); *G02B 6/28* (2013.01);
    (Continued)

(58) Field of Classification Search
    CPC ........... C03B 37/15; C03B 40/00; G02B 6/14; G02B 6/28; G02B 6/0281; G02B 6/03616;
    (Continued)

(56) References Cited

U.S. PATENT DOCUMENTS 4,252,403 A * 2/1981 Salisbury ............... G02B 6/262
                                                              385/127
4,266,851 A * 5/1981 Salisbury ............. G02B 6/2551
                                                          250/227.24

(Continued)

FOREIGN PATENT DOCUMENTS

CA        2242139       12/1999
CA        2292974 A1    6/2000
                    (Continued)

OTHER PUBLICATIONS

Salceda-Delgado et al., Compact fiber-optic curvature sensor based on super-mode interference in a seven-core fiber, Optics Letters, V. 40, N. 7, 2015 (Year: 2015).*

(Continued)

*Primary Examiner* — Peter Radkowski
(74) *Attorney, Agent, or Firm* — Schwabe Williamson & Wyatt

(57) ABSTRACT

Fiber bending mechanisms vary beam characteristics by deflecting or bending one or more fibers, by urging portions of one or more fibers toward a fiber shaping surface having a selectable curvature, or by selecting a fiber length that is to be urged toward the fiber shaping surface. In some examples, a fiber is secured to a flexible plate to conform to a variable curvature of the flexible plate. In other examples, a variable length of a fiber is pulled or pushed toward a fiber shaping surface, and the length of the fiber or a curvature of the flexible plate provide modification of fiber beam characteristics.

21 Claims, 22 Drawing Sheets

Related U.S. Application Data continuation-in-part of application No. 15/607,410, filed on May 26, 2017, now Pat. No. 10,663,767, and a continuation-in-part of application No. 15/607,399, filed on May 26, 2017, now Pat. No. 10,423,015, and a continuation-in-part of application No. PCT/US2017/034848, filed on May 26, 2017, and a continuation-in-part of application No. 15/607,411, filed on May 26, 2017, now Pat. No. 10,295,845.

(60) Provisional application No. 62/401,650, filed on Sep. 29, 2016.

(51) Int. Cl.
  *C03B 40/00* (2006.01)
  *G02B 6/28* (2006.01)
  *G02B 6/036* (2006.01)
  *G02B 6/42* (2006.01)
  *G02B 6/028* (2006.01)
  *G02B 6/26* (2006.01)

(52) U.S. Cl.
  CPC .......... *G02B 6/0281* (2013.01); *G02B 6/0365* (2013.01); *G02B 6/03616* (2013.01); *G02B 6/03627* (2013.01); *G02B 6/03633* (2013.01); *G02B 6/03638* (2013.01); *G02B 6/03688* (2013.01); *G02B 6/262* (2013.01); *G02B 6/4296* (2013.01)

(58) Field of Classification Search
  CPC ............ G02B 6/03627; G02B 6/03633; G02B 6/03638; G02B 6/0365; G02B 6/03688; G02B 6/262; G02B 6/4296
  See application file for complete search history.

(56) References Cited

U.S. PATENT DOCUMENTS

| | | | |
|---|---|---|---|
| 4,315,666 A | 2/1982 | Hicks, Jr. | |
| 4,614,868 A | 9/1986 | Alster | |
| 4,698,480 A * | 10/1987 | Klingel | B23Q 3/15573 219/121.84 |
| 4,725,124 A * | 2/1988 | Taylor | G02F 1/0134 385/16 |
| 4,770,492 A | 9/1988 | Levin et al. | |
| 4,822,135 A * | 4/1989 | Seaver | G01D 5/268 356/73.1 |
| 4,915,468 A * | 4/1990 | Kim | G01D 5/344 385/28 |
| 4,953,947 A | 9/1990 | Bhagavatula | |
| 5,427,733 A | 6/1995 | Benda et al. | |
| 5,530,221 A | 6/1996 | Benda et al. | |
| 5,566,196 A * | 10/1996 | Scifres | H01S 3/06708 372/6 |
| 5,732,178 A * | 3/1998 | Terasawa | G02B 6/02042 385/127 |
| 5,837,962 A | 11/1998 | Overbeck | |
| 5,915,050 A | 6/1999 | Russell et al. | |
| 6,180,912 B1 | 1/2001 | Tatah | |
| 6,192,171 B1 | 2/2001 | Goodman et al. | |
| 6,304,704 B1 | 10/2001 | Kalish et al. | |
| 6,360,042 B1 | 3/2002 | Long | |
| 6,477,301 B1 | 11/2002 | Anthon et al. | |
| 6,483,973 B1 * | 11/2002 | Mazzarese | H01S 3/06708 372/6 |
| 6,487,338 B2 * | 11/2002 | Asawa | H04B 10/2581 385/127 |
| 6,564,442 B2 * | 5/2003 | Kilian | B23P 23/00 72/461 |
| 6,600,149 B2 | 7/2003 | Schulz et al. | |
| 6,621,044 B2 | 9/2003 | Jain | |
| 6,694,079 B1 * | 2/2004 | Matsuo | G02B 6/0365 385/126 |
| 6,895,154 B2 * | 5/2005 | Johnson | B82Y 20/00 385/127 |
| 6,947,802 B2 * | 9/2005 | Picard | B23K 26/032 700/170 |
| 7,174,078 B2 * | 2/2007 | Libori | G02B 6/0238 385/127 |
| 7,215,858 B2 * | 5/2007 | Po | G02B 6/03633 385/127 |
| 7,242,834 B2 * | 7/2007 | Lee | G02F 1/395 385/144 |
| 7,260,292 B2 | 8/2007 | Sahlgren | |
| 7,260,299 B1 * | 8/2007 | Di Teodoro | H01S 3/06758 385/125 |
| 7,426,410 B2 * | 9/2008 | Zuluaga | A61B 5/0062 600/478 |
| 7,437,041 B2 * | 10/2008 | Po | G02B 6/03611 385/123 |
| 7,519,251 B2 * | 4/2009 | Aalto | G02B 6/02 385/29 |
| 7,592,568 B2 * | 9/2009 | Varnham | B23K 26/0734 219/121.73 |
| 7,783,149 B2 * | 8/2010 | Fini | G02B 6/02009 385/124 |
| 7,876,495 B1 * | 1/2011 | Minelly | G02B 6/02371 359/341.1 |
| 7,907,810 B2 * | 3/2011 | Messerly | G02B 6/03611 365/126 |
| 7,916,762 B2 * | 3/2011 | Messerly | H01S 3/235 372/18 |
| 7,996,069 B2 * | 8/2011 | Zuluaga | G02B 23/26 600/478 |
| 8,218,928 B2 * | 7/2012 | Jasapara | H04B 10/2581 359/341.1 |
| 8,270,787 B2 * | 9/2012 | Sumetsky | G02B 6/305 385/28 |
| 8,488,925 B2 * | 7/2013 | Sumetsky | G02B 6/305 385/42 |
| 8,546,717 B2 * | 10/2013 | Stecker | B22F 12/38 219/121.13 |
| 8,628,227 B2 | 1/2014 | Olschowsky | |
| 8,660,396 B2 * | 2/2014 | Tanigawa | G02B 6/02033 385/127 |
| 8,731,010 B2 * | 5/2014 | Messerly | H01S 3/2383 372/18 |
| 8,755,660 B1 * | 6/2014 | Minelly | G02B 6/02357 359/341.1 |
| 8,781,269 B2 * | 7/2014 | Huber | B23K 26/064 385/18 |
| 8,798,422 B2 * | 8/2014 | Messerly | C03B 37/01807 385/127 |
| 8,811,787 B2 * | 8/2014 | Feuer | H04J 14/04 385/126 |
| 8,903,211 B2 | 12/2014 | Fini et al. | |
| 8,909,017 B2 * | 12/2014 | Jasapara | H04B 10/2581 359/341.1 |
| 8,923,678 B2 * | 12/2014 | Fini | G02B 6/02042 385/126 |
| 8,934,742 B2 * | 1/2015 | Voss | G02B 6/3528 385/20 |
| 8,958,144 B2 | 2/2015 | Rataj et al. | |
| 8,983,260 B2 * | 3/2015 | Sillard | G02B 6/0365 385/127 |
| 9,046,654 B2 | 6/2015 | Salokatve | |
| 9,140,873 B2 * | 9/2015 | Minelly | H01S 3/06741 |
| 9,170,367 B2 * | 10/2015 | Messerly | G02B 6/02338 |
| 9,250,390 B2 * | 2/2016 | Muendel | G02B 6/4216 |
| 9,310,560 B2 * | 4/2016 | Chann | G02B 6/2817 |
| 9,339,890 B2 * | 5/2016 | Woods | B23K 26/36 |
| 9,366,887 B2 * | 6/2016 | Tayebati | G02B 6/32 |
| 9,399,264 B2 * | 7/2016 | Stecker | B23K 15/0086 |
| 9,431,786 B2 * | 8/2016 | Savage-Leuchs | H01S 3/06783 |
| 9,482,821 B2 * | 11/2016 | Huber | B23K 26/067 |
| 9,636,775 B2 | 5/2017 | Huang | |

(56) References Cited

U.S. PATENT DOCUMENTS

| | | | |
|---|---|---|---|
| 9,709,676 B2* | 7/2017 | Eno | G01S 17/08 |
| 9,823,422 B2* | 11/2017 | Muendel | G02B 6/4216 |
| 9,839,977 B2 | 12/2017 | Liebl | |
| 10,112,262 B2* | 10/2018 | Cheverton | B23K 26/034 |
| 10,189,114 B2* | 1/2019 | Stecker | B23K 15/0013 |
| 10,201,875 B2 | 2/2019 | Liebl | |
| 10,214,833 B1 | 2/2019 | Kaehr et al. | |
| 10,281,656 B2* | 5/2019 | Huber | G02B 6/03644 |
| 10,337,335 B2 | 7/2019 | Pavlov | |
| 10,576,581 B2 | 3/2020 | Liebl | |
| 10,646,963 B2* | 5/2020 | Victor | B23K 26/34 |
| 10,656,427 B2* | 5/2020 | Rivera | G02B 6/02042 |
| 10,656,440 B2* | 5/2020 | Kliner | G02B 6/02042 |
| 10,663,767 B2* | 5/2020 | Kliner | G02F 1/0115 |
| 10,670,872 B2* | 6/2020 | Karlsen | G02B 6/02042 |
| 10,705,348 B2* | 7/2020 | Martinsen | G02B 6/0006 |
| 10,730,785 B2* | 8/2020 | Brown | G02B 6/28 |
| 10,751,834 B2* | 8/2020 | Koponen | B23K 26/0643 |
| 10,971,885 B2 | 4/2021 | Kliner et al. | |
| 11,215,761 B2* | 1/2022 | Huber | B23K 26/073 |
| 11,344,967 B2* | 5/2022 | Stecker | B22F 10/368 |
| 2001/0005439 A1 | 6/2001 | Kim et al. | |
| 2001/0045149 A1 | 11/2001 | Dunsky et al. | |
| 2002/0126954 A1* | 9/2002 | Aswawa | G02B 6/262 385/28 |
| 2002/0130279 A1 | 9/2002 | Jain | |
| 2002/0176676 A1* | 11/2002 | Johnson | G02B 6/02257 385/125 |
| 2003/0204283 A1* | 10/2003 | Picard | B23K 26/032 700/166 |
| 2004/0247222 A1 | 12/2004 | Park | |
| 2004/0249289 A1* | 12/2004 | Zuluaga | G02B 23/26 600/478 |
| 2005/0069269 A1* | 3/2005 | Libori | G02B 6/03627 385/125 |
| 2005/0105854 A1 | 5/2005 | Dong et al. | |
| 2005/0111802 A1* | 5/2005 | Lee | G02B 6/03644 385/124 |
| 2006/0013532 A1 | 1/2006 | Wan | |
| 2006/0215976 A1 | 9/2006 | Singh et al. | |
| 2006/0219673 A1* | 10/2006 | Varnham | B23K 26/0734 219/121.85 |
| 2007/0041083 A1* | 2/2007 | Di Teodoro | C03B 37/10 359/333 |
| 2007/0104431 A1* | 5/2007 | Di Teodoro | H01S 3/06754 385/123 |
| 2007/0164005 A1 | 7/2007 | Matsuda | |
| 2007/0206900 A1* | 9/2007 | Po | G02B 6/03611 385/37 |
| 2007/0280597 A1 | 12/2007 | Nakai et al. | |
| 2007/0297738 A1* | 12/2007 | Aalto | G02B 6/30 385/129 |
| 2008/0251504 A1 | 10/2008 | Lu et al. | |
| 2008/0260338 A1* | 10/2008 | Messerly | G02B 6/03611 385/127 |
| 2008/0285927 A1* | 11/2008 | Khan | C03B 37/01446 65/424 |
| 2009/0012407 A1* | 1/2009 | Zuluaga | A61B 5/0084 600/478 |
| 2009/0032394 A1 | 2/2009 | Wu | |
| 2009/0059352 A1* | 3/2009 | Fini | H01S 3/06754 359/337 |
| 2009/0059353 A1* | 3/2009 | Fini | H01S 3/06708 385/124 |
| 2009/0202191 A1 | 8/2009 | Ramachandran | |
| 2009/0296747 A1* | 12/2009 | Messerly | H01S 3/235 372/6 |
| 2010/0150201 A1 | 6/2010 | Shin et al. | |
| 2010/0195194 A1 | 8/2010 | Chen et al. | |
| 2010/0209044 A1* | 8/2010 | Sumetsky | G02B 6/305 385/28 |
| 2010/0271689 A1* | 10/2010 | Jasapara | G02B 6/0288 359/341.1 |
| 2010/0326969 A1 | 12/2010 | Tsukamoto et al. | |
| 2011/0061591 A1* | 3/2011 | Stecker | B33Y 40/00 118/663 |
| 2011/0129190 A1* | 6/2011 | Fini | G02B 6/02042 264/1.28 |
| 2011/0134512 A1 | 6/2011 | Ahn et al. | |
| 2011/0188826 A1* | 8/2011 | Sillard | G02B 6/0228 385/127 |
| 2011/0243164 A1* | 10/2011 | Messerly | H01S 3/235 372/28 |
| 2011/0249940 A1 | 10/2011 | Sasaoka | |
| 2011/0253668 A1 | 10/2011 | Winoto et al. | |
| 2011/0305251 A1* | 12/2011 | Tanigawa | G02B 6/03638 359/341.1 |
| 2012/0128294 A1* | 5/2012 | Voss | G02B 6/3534 385/16 |
| 2012/0237164 A1* | 9/2012 | Jasapara | G02B 6/0288 385/33 |
| 2012/0301077 A1* | 11/2012 | Sumetsky | G02B 6/305 385/32 |
| 2012/0321260 A1* | 12/2012 | Messerly | G02B 6/03688 65/412 |
| 2013/0044768 A1 | 2/2013 | Ter-Mikirtychev | |
| 2013/0114285 A1 | 5/2013 | Olschowsky | |
| 2013/0136404 A1* | 5/2013 | Feuer | H04B 10/2581 385/124 |
| 2013/0146569 A1* | 6/2013 | Woods | B23K 26/20 219/121.72 |
| 2013/0148925 A1* | 6/2013 | Muendel | G02B 6/4216 385/27 |
| 2013/0202264 A1* | 8/2013 | Messerly | G02B 6/02338 385/123 |
| 2013/0223792 A1* | 8/2013 | Huber | G02B 6/262 385/127 |
| 2013/0294728 A1 | 11/2013 | Rockwell | |
| 2013/0343947 A1* | 12/2013 | Satzger | B22F 10/28 374/142 |
| 2014/0014629 A1* | 1/2014 | Stecker | B22F 12/90 219/76.14 |
| 2014/0021178 A1* | 1/2014 | Brockmann | G02B 6/3528 219/121.77 |
| 2015/0060422 A1 | 3/2015 | Liebl | |
| 2015/0086159 A1 | 3/2015 | Salokatve et al. | |
| 2015/0104139 A1* | 4/2015 | Brunet | G02B 6/03666 385/124 |
| 2015/0198052 A1 | 7/2015 | Pavlov | |
| 2015/0241632 A1* | 8/2015 | Chann | G02B 6/4296 385/27 |
| 2015/0246481 A1 | 9/2015 | Schlick | |
| 2015/0293306 A1* | 10/2015 | Huber | B23K 26/073 385/18 |
| 2015/0331205 A1* | 11/2015 | Tayebati | G02B 6/4214 385/27 |
| 2015/0378184 A1* | 12/2015 | Tayebati | G02B 27/1006 250/492.1 |
| 2016/0016369 A1 | 1/2016 | Tarbutton | |
| 2016/0036193 A1* | 2/2016 | Eno | H01S 3/06704 372/6 |
| 2016/0097903 A1* | 4/2016 | Li | G02B 6/02042 385/50 |
| 2016/0104995 A1* | 4/2016 | Savage-Leuchs | G02B 6/32 359/341.1 |
| 2016/0114431 A1* | 4/2016 | Cheverton | B22F 10/31 219/76.1 |
| 2016/0116679 A1* | 4/2016 | Muendel | B23K 26/0626 385/11 |
| 2016/0175935 A1 | 6/2016 | Ladewig et al. | |
| 2016/0184925 A1 | 6/2016 | Huang | |
| 2016/0202285 A1* | 7/2016 | Wang | G01H 9/004 250/227.14 |
| 2016/0288244 A1 | 10/2016 | Stecker | B33Y 40/00 |
| 2016/0320685 A1* | 11/2016 | Tayebati | G21K 5/02 |
| 2017/0003461 A1* | 1/2017 | Tayebati | B23K 26/0626 |
| 2017/0036299 A1 | 2/2017 | Goya et al. | |
| 2017/0090462 A1 | 3/2017 | Dave et al. | |
| 2017/0336580 A1* | 11/2017 | Tayebati | G02B 6/32 |
| 2018/0104770 A1 | 4/2018 | Liebl | |

(56) References Cited

U.S. PATENT DOCUMENTS

| | | | |
|---|---|---|---|
| 2019/0047085 A1 | 2/2019 | Liebl | |
| 2019/0084082 A1 | 3/2019 | Ito | |
| 2019/0143445 A1* | 5/2019 | Stecker | B23K 15/0093 219/121.16 |
| 2019/0217422 A1 | 7/2019 | Kramer et al. | |
| 2019/0262949 A1 | 8/2019 | Malinowski et al. | |
| 2019/0270161 A1 | 9/2019 | Allenberg-Rabe et al. | |
| 2020/0251237 A1 | 8/2020 | Gross | |
| 2020/0263978 A1 | 8/2020 | Pieger et al. | |
| 2020/0333640 A1 | 10/2020 | Kliner et al. | |
| 2022/0258276 A1* | 8/2022 | Stecker | B22F 12/38 |

FOREIGN PATENT DOCUMENTS

| | | | |
|---|---|---|---|
| CN | 101071926 | | 11/2007 |
| CN | 103293594 | | 6/2013 |
| CN | 104136952 | | 11/2014 |
| EP | 0048855 | | 5/1982 |
| EP | 0798067 | A | 1/1997 |
| EP | 1340583 | | 9/2003 |
| EP | 2596901 | | 5/2013 |
| EP | 2732890 | | 5/2014 |
| JP | 60046892 | | 3/1985 |
| JP | H07113922 | | 12/1995 |
| JP | 10282450 | | 10/1998 |
| JP | H11-231138 | | 8/1999 |
| JP | H11-344636 | | 12/1999 |
| JP | 2001166172 | | 6/2001 |
| JP | 200455366 | | 5/2004 |
| JP | 2005-203430 | | 7/2005 |
| JP | 2006-285234 | | 10/2006 |
| JP | 2007-518566 | | 7/2007 |
| JP | 4112355 | | 7/2008 |
| JP | 2009-193070 | | 8/2009 |
| JP | 2010115686 | | 5/2010 |
| JP | 2011134736 | | 7/2011 |
| JP | 2011221191 | A | 11/2011 |
| JP | 2014509263 | A | 4/2014 |
| JP | 2015-500571 | | 1/2015 |
| TW | 504425 | | 10/2002 |
| WO | 2001/74529 | | 10/2001 |
| WO | 2002084350 | | 10/2002 |
| WO | 2003/044914 | | 5/2003 |
| WO | 2004056524 | | 7/2004 |
| WO | 2005/053895 | A1 | 6/2005 |
| WO | 2020050774 | | 4/2012 |
| WO | 2012/088361 | | 6/2012 |
| WO | 2013/086227 | | 6/2013 |
| WO | 2015/146591 | | 10/2015 |
| WO | 2015151865 | | 10/2015 |
| WO | 2016/031895 | A1 | 3/2016 |
| WO | WO-2016031895 | A1 * | 3/2016 ............ A61B 18/20 |
| WO | 2016/059938 | | 4/2016 |
| WO | 2016/156824 | | 10/2016 |
| WO | 2016198724 | | 12/2016 |
| WO | 2017036695 | | 3/2017 |

OTHER PUBLICATIONS

Schermer, Ross, Mode scalability in bent optical fibers, Optics Express, V. 15, N. 24, 2007 (Year: 2007).*
Villatoro et al, Photonic crystal fiber interferometric vector bending sensor, Optics Letters, V. 40, N. 13, 2015 (Year: 2015).*
Yoda et al., Beam Quality Factor of Higher Order Modes in a Step-Index Fiber, Journal of Lightwave Technology, vol. 24, No. 3, 2006 (Year: 2006).*
Birks et al., RR 2015, 'The photonic lantern', Advances in Optics and Photonics, vol. 7, No. 2, pp. 107-167. https://doi.org/10.1364/AOP.7.000107. (Year: 2015).*
Leon-Saval et al., Photonic Lanterns, Nanophotonics 2013; 2(5-6): 429-440 (Year: 2013).*
Eilzer et al., "Industrial fiber beam delivery system for ultrafast lasers: applications and recent advances," Proc. SPIE 9741, High-Power Laser Materials Processing: Lasers, Beam Delivery, Diagnostics, and Applications V, 974103 (Mar. 18, 2016); https://doi.org/10.1117/12.2214290 (Year: 2016).*
Williams et al., "Measuring laser power as a force: a new paradigm to accurately monitor optical power during laser-based machining operations," Proc. SPIE 9741, High-Power Laser Materials Processing: Lasers, Beam Delivery, Diagnostics, and Applications V, 97410L (Year: 2016).*
Thombansen et al., "Observation of melting conditions in selective laser melting of metals (SLM)," Proc. SPIE 9741, High-Power Laser Materials Processing: Lasers, Beam Delivery, Diagnostics, and Applications V, 97410S (Mar. 18, 2016); https://doi.org/10.1117/12.2213952 (Year: 2016).*
Stritt et al., "Comprehensive process monitoring for laser welding process optimization," Proc. SPIE 9741, High-Power Laser Materials Processing: Lasers, Beam Delivery, Diagnostics, and Applications V, 97410Q (Mar. 18, 2016); https://doi.org/10.1117/12.2212814 (Year: 2016).*
Simmons et al., "Development of a non-contact diagnostic tool for high power lasers," Proc. SPIE 9741, High-Power Laser Materials Processing: Lasers, Beam Delivery, Diagnostics, and Applications V, 97410N (Mar. 18, 2016); https://doi.org/10.1117/12.2213605 (Year: 2016).*
Lempe et al., "Analysis of weld seam uniformity through temperature distribution by spatially resolved detector elements in the wavelength range of 0.3μm to 5μm for the detection of structural changing heating and cooling processes," Proc. SPIE 9741 (Year: 2016).*
Joel Villatoro, Vladimir P. Minkovich, and Joseba Zubia, "Photonic crystal fiber interferometric vector bending sensor," Opt. Lett. 40, 3113-3116 (2015) (Year: 2016).*
Michael J. Messerly, Paul H. Pax, Jay W. Dawson, Raymond J. Beach, and John E. Heebner, "Field-flattened, ring-like propagation modes," Opt. Express 21, 12683-12698 (2013) (Year: 2013).*
Ross T. Schermer, "Mode scalability in bent optical fibers," Opt. Express 15, 15674-15701 (2007) (Year: 2017).*
G. Salceda-Delgado, A. Van Newkirk, J. E. Antonio-Lopez, A. Martinez-Rios, A. Schülzgen, and R. Amezcua Correa, "Compact fiber-optic curvature sensor based on super-mode interference in a seven-core fiber," Opt. Lett. 40, 1468-1471 (2015) (Year: 2015).*
Victor, Brian M., Custom Beam Shaping for High-Power Fiber Laser Welding, Thesis, The Ohio State University, 2009. (Year: 2009).*
Hidehiko Yoda, Pavel Polynkin, and Masud Mansuripur, "Beam Quality Factor of Higher Order Modes in a Step-Index Fiber," J. Lightwave Technol. 24, 1350—(2006) (Year: 2006).*
P. Vaity, C. Brunet, Y. Messaddeq, S. LaRochelle and L. A. Rusch, "Exciting OAM modes in annular-core fibers via perfect OAM beams," 2014 The European Conference on Optical Communication (ECOC), Cannes, France, 2014, pp. 1-3, doi: 10.1109/ECOC.2014.6964195. (Year: 2014).*
Van Newkirk et al., Bending sensor combining multicore fiber with a mode-selective photonic lantern, Optics Letters, V. 40, N. 22, 2015 (Year: 2015).*
Uden et al., Ultra-high-density spatial division multiplexing with a few-mode multicore fibre. Nature Photonics, 8(11), 865-870, 2014 (Year: 2014).*
Kuang et al., Plastic Optical Fiber Displacement Sensor Based on Dual Cycling Bending, Sensors 2010, 10, 10198-10210; doi: 10.3390/s101110198 (Year: 2010).*
Donlagic et al., Propagation of the Fundamental Mode in Curved Graded Index Multimode Fiber and Its Application in Sensor Systems, Journal of Lightwave Technology, vol. 18, No. 3, Mar. 2000 (Year: 2000).*
Anderson DZ, Bolshtyansky MA, Zel'dovich BY. Stabilization of the speckle pattern of a multimode fiber undergoing bending. Opt Lett. Jun. 1, 1996;21(11):785-7. doi: 10.1364/ol.21.000785. PMID: 19876158. (Year: 1996).*
R. Wang et al., "Highly Sensitive Curvature Sensor Using an In-Fiber Mach-Zehnder Interferometer," in IEEE Sensors Journal, vol. 13, No. 5, pp. 1766-1770, May 2013, doi: 10.1109/JSEN.2013.2243834. (Year: 2013).*

(56) References Cited

OTHER PUBLICATIONS

Blecher, J. & Palmer, Todd & Kelly, Shawn & Martukanitz, Richard. (2012). Identifying Performance Differences in Transmissive and Reflective Laser Optics Using Beam Diagnostic Tools. Welding Journal. 91. 204S-214S. (Year: 2012).*
Extended European Search Report from European Application No. 18805726.9, dated Nov. 3, 2020, 8 pages.
Extended European Search Report from European Application No. 18805628.7, dated Nov. 6, 2020, 7 pages.
Extended European Search Report from European Application No. 18805019.9, dated Nov. 9, 2020, 7 pages.
Extended European Search Report from European Application No. 18805369.8, dated Nov. 9, 2020, 7 pages.
Extended European Search Report from European Application No. 18806895.1, dated Nov. 10, 2020, 7 pages.
Extended European Search Report from European Application No. 18805491.0, dated Nov. 23, 2020, 7 pages.
Extended European Search Report from European Application No. 18804952.2, dated Nov. 24, 2020, 7 pages.
Extended European Search Report from European Application No. 18805725.1, dated Nov. 24, 2020, 7 pages.
Extended European Search Report from European Application No. 18805152.8, dated Nov. 30, 2020, 8 pages.
Extended European Search Report from European Application No. 18703678.5, dated Dec. 18, 2020, 14 pages.
Extended European Search Report from European Application No. 18806084.2, dated Jan. 25, 2021, 40 pages.
Partial Supplementary European Search Report from European Application No. 18806154.3, dated Feb. 5, 2021, 16 pages.
Villatoro et al., "Photonic Crystal Fiber Interferometric Vector Bending Sensor," Optics Letters, 40(13):3113-3116 (Jul. 1, 2015).
Yoda et al., "Beam Quality Factor of Higher Order Modes in a Step-Index Fiber," Journal of Lightwave Technology, 24(3):1350-1355 (Mar. 2006).
Schermer, Ross: "Mode Scalability in bent Optical Fibers"; optics Express, V 15, N. Nov. 24, 2007.
Cindy Fernandes et al.; Curvature and Vibration Sensing Based on Core Diameter Mismatch Structures; IEEE transaction on Instrumentation and Measurement, vol. 65. No. 9; Sep. 2016; pp. 2120-2128.
Anderson et al, "On the Use of Microbend Fiber Optic Mode Strippers and Scramblers: Cautionary Note," Appl. Opt. 34, 8082-8083 (1995).
Jin et al., "Numerical investigation for Microbending Loss in Optical Fibres", J. Lightwave Technol. 34, 1247-1253 (2016).
Ploschner et al., "Compact Multimode Fiber Beam-shaping System Based on GPU Accelerated Digital Holography", Opt. Lett. 40, 197-200 (2015).
Ramachandran et al., "Optical Vortices in Fiber", Nanophotonics, vol. 2, No. 5-6, (2013) pp. 455-474. https://doi.org/10.1515/nanoph-2013-0047.
Weber et al., "Effects of Radial and Tangential Polarization in Laser Material Processing", Physicas Procedia, vol. 12, Part A, pp. 21-30, ISSN 1875-3892 (2011).

* cited by examiner

PERTURBING A FIRST LENGTH OF FIBER AND/OR AN OPTICAL BEAM TO ADJUST ONE OR MORE BEAM CHARACTERISTICS OF THE OPTICAL BEAM
2502

LAUNCHING THE OPTICAL BEAM INTO A SECOND LENGTH OF FIBER
2504

PROPAGATING THE OPTICAL BEAM HAVING THE ADJUSTED BEAM CHARACTERISTICS IN THE SECOND LENGTH OF FIBER
2506

MAINTAINING AT LEAST A PORTION OF THE ONE OR MORE ADJUSTED BEAM CHARACTERISTICS OF THE OPTICAL BEAM WITHIN ONE OR MORE CONFINEMENT REGIONS OF THE SECOND LENGTH OF FIBER
2508

FIG. 25

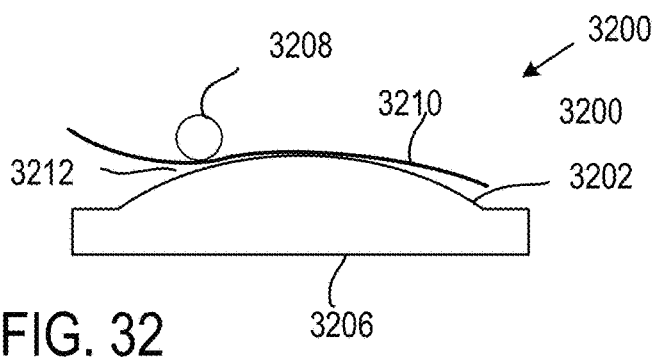
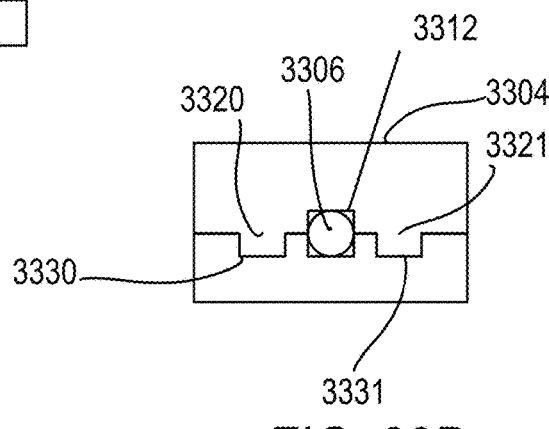
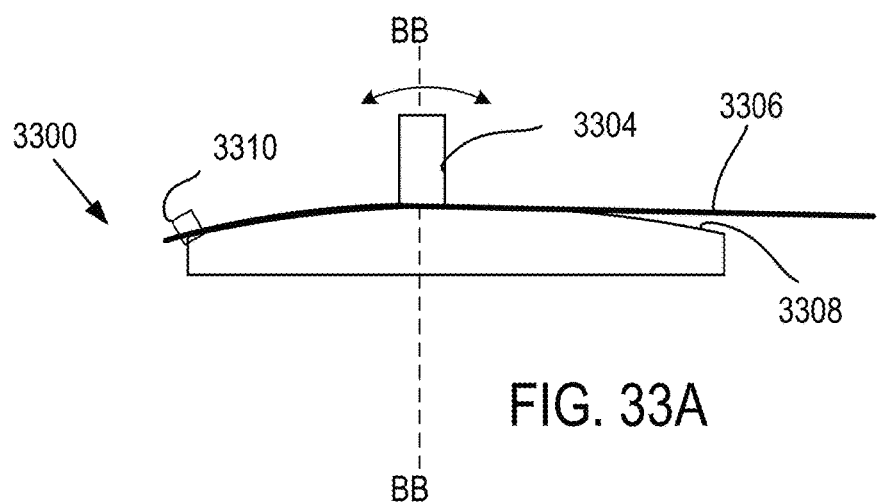
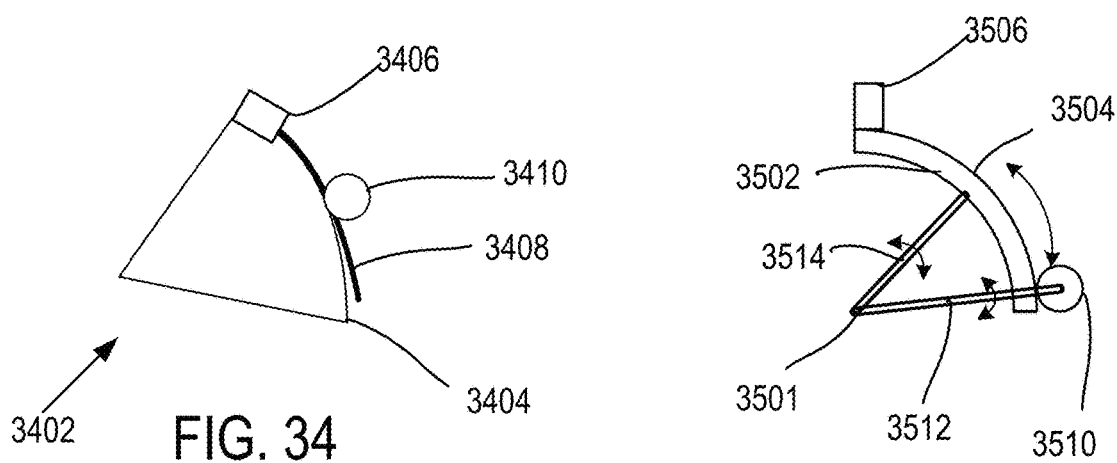
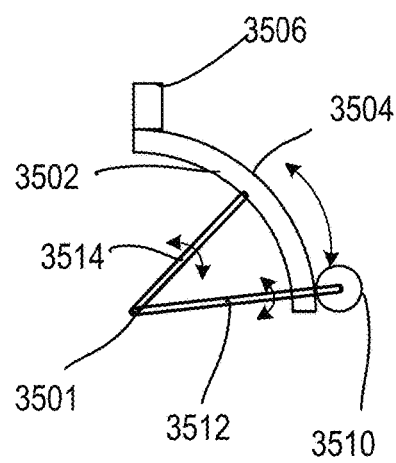

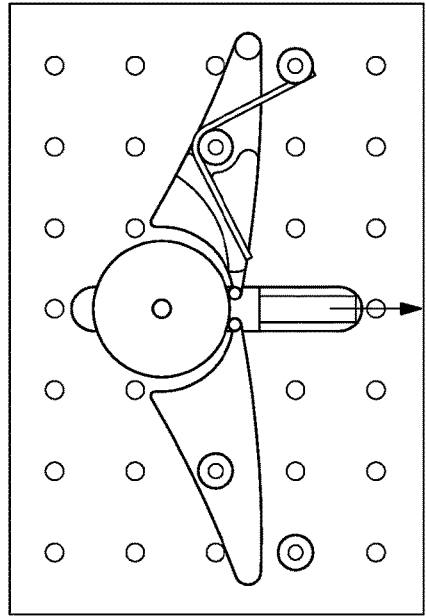
FIG. 38B
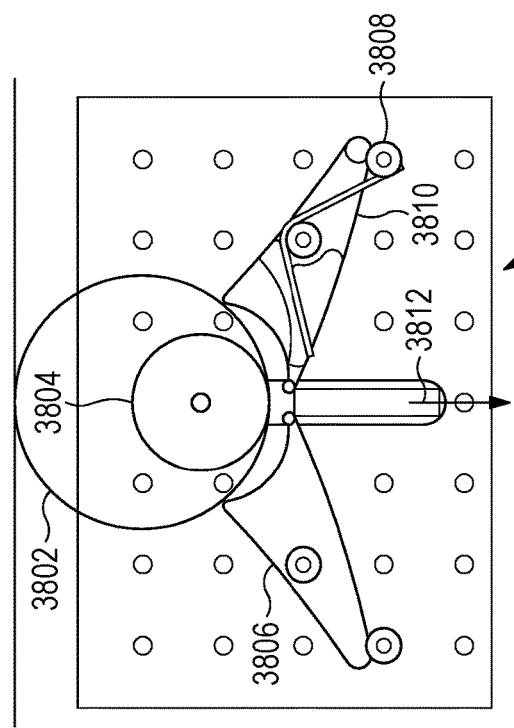
FIG. 38A
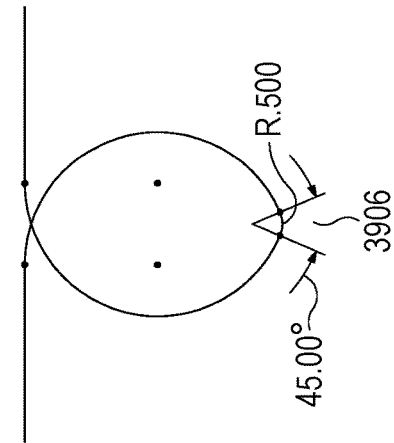
FIG. 39D
FIG. 39C
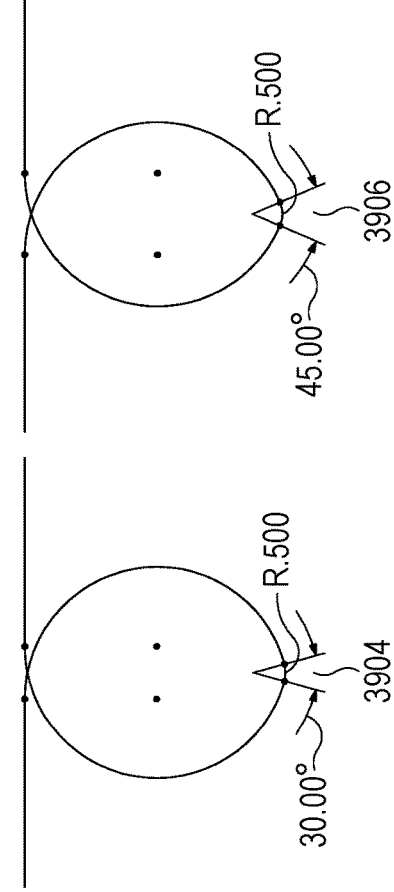
FIG. 39B
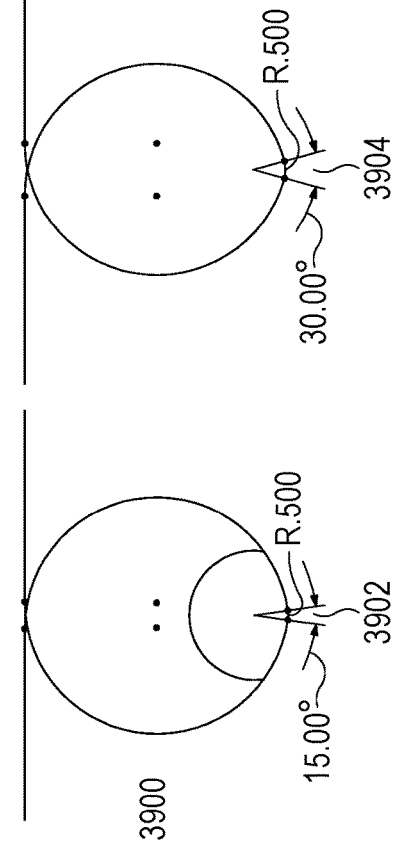
FIG. 39A

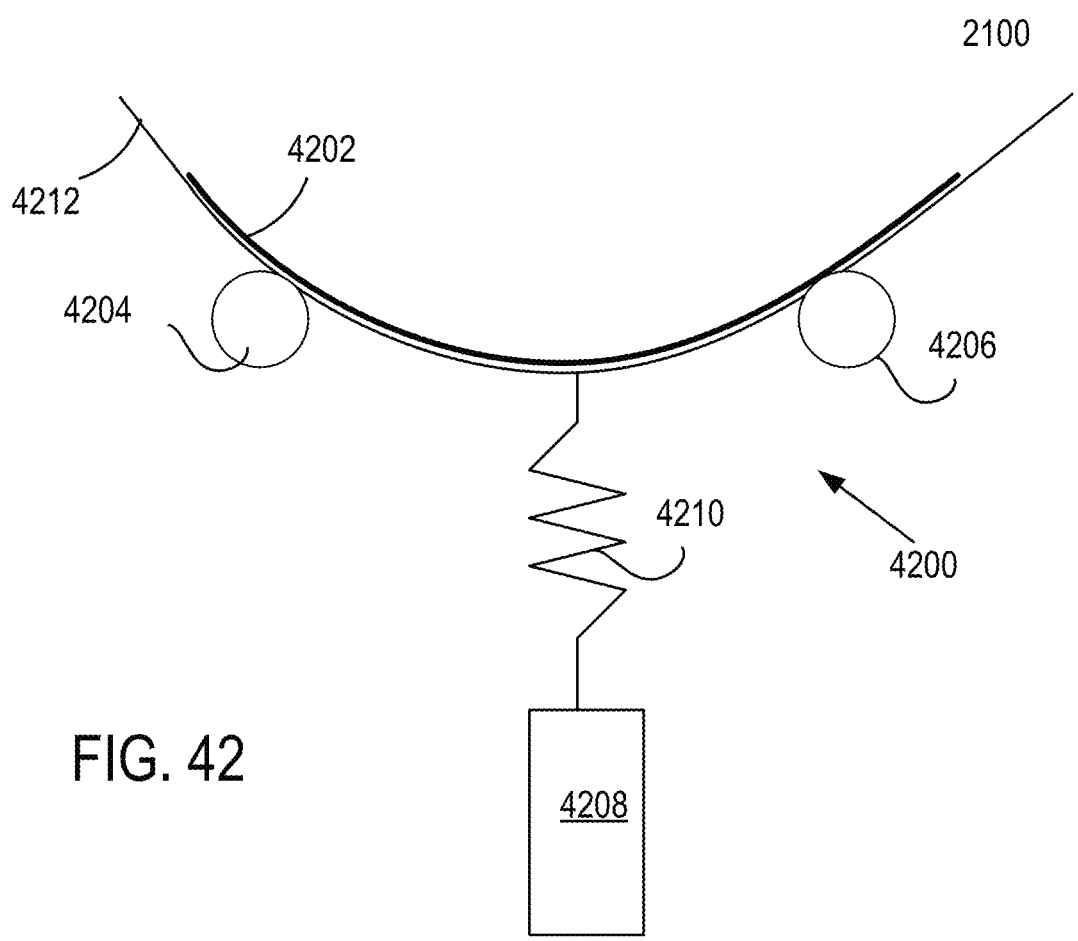
FIG. 42
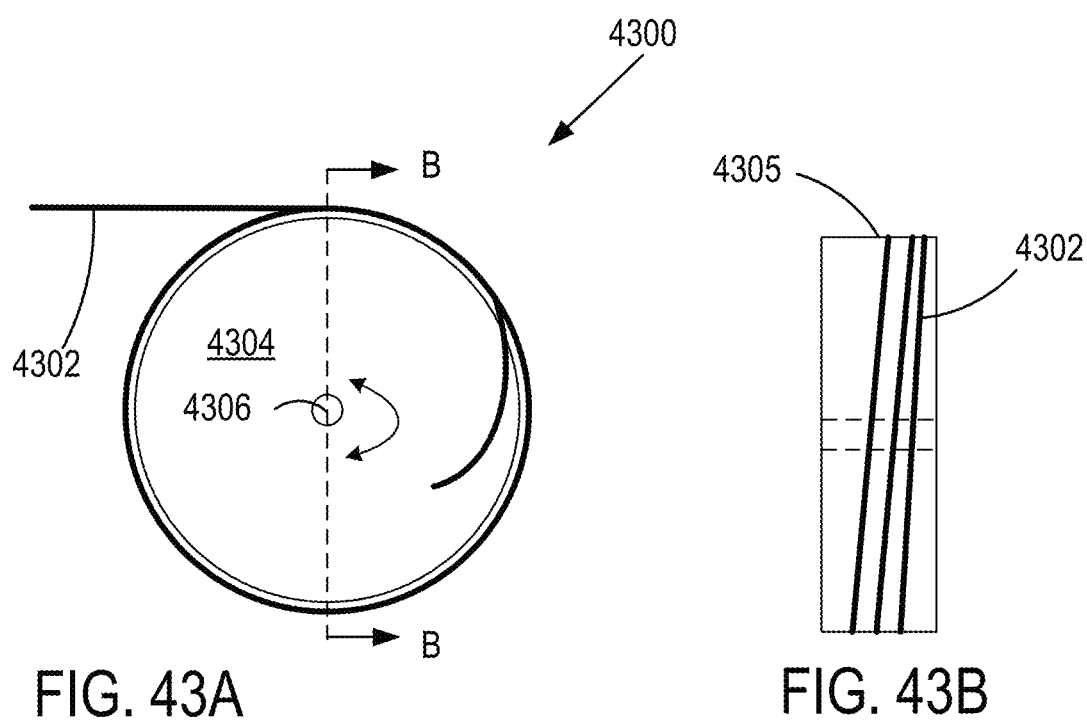
FIG. 43A
FIG. 43B

OPTICAL FIBER BENDING MECHANISMS

CROSS REFERENCE TO RELATED APPLICATIONS

This application is a continuation of U.S. patent application Ser. No. 15/938,959, filed Mar. 28, 2018, which is a continuation-in-part of U.S. patent application Ser. No. 15/607,399, filed May 26, 2017, now issued as U.S. Pat. No. 10,423,015, and U.S. patent application Ser. No. 15/607,410, filed May 26, 2017, and U.S. patent application Ser. No. 15/607,411, filed May 26, 2017, now issued as U.S. Pat. No. 10,295,845, and Patent Cooperation Treat Application No. PCT/US2017/034848, filed May 26, 2017, all of which claim the benefit of U.S. Provisional Application No. 62/401,650, filed Sep. 29, 2016. These applications are incorporated by reference herein in their entireties.

FIELD

The disclosure pertains to beam shaping in optical fibers.

BACKGROUND

The use of high-power fiber-coupled lasers continues to gain popularity for a variety of applications, such as materials processing, cutting, welding, and/or additive manufacturing. These lasers include, for example, fiber lasers, disk lasers, diode lasers, diode-pumped solid state lasers, and lamp-pumped solid state lasers. In these systems, optical power is delivered from the laser to a work piece via an optical fiber.

Various fiber-coupled laser materials processing tasks require different beam characteristics (e.g., spatial profiles and/or divergence profiles). For example, cutting thick metal and welding generally require a larger spot size than cutting thin metal. Ideally, the laser beam properties would be adjustable to enable optimized processing for these different tasks. Conventionally, users have two choices: (1) Employ a laser system with fixed beam characteristics that can be used for different tasks but is not optimal for most of them (i.e., a compromise between performance and flexibility); or (2) Purchase a laser system or accessories that offer variable beam characteristics but that add significant cost, size, weight, complexity, and perhaps performance degradation (e.g., optical loss) or reliability degradation (e.g., reduced robustness or up-time). Currently available laser systems capable of varying beam characteristics require the use of free-space optics or other complex and expensive add-on mechanisms (e.g., zoom lenses, mirrors, translatable or motorized lenses, combiners, etc.) in order to vary beam characteristics. No solution exists that provides the desired adjustability in beam characteristics that minimizes or eliminates reliance on the use of free-space optics or other extra components that add significant penalties in terms of cost, complexity, performance, and/or reliability. What is needed is an in-fiber apparatus for providing varying beam characteristics that does not require or minimizes the use of free-space optics and that can avoid significant cost, complexity, performance tradeoffs, and/or reliability degradation.

SUMMARY

Apparatus comprise a first fiber situated to receive an input optical beam, the first fiber having a first refractive index profile. A fiber shaping surface is situated so that a section of at least the first fiber is urged to conform a fiber shaping surface. A bend controller is situated to select a length of the section of the first fiber urged to conform to the fiber shaping surface or to select a curvature of the fiber shaping surface to perturb the input optical beam and produce a modified optical beam. A second fiber is coupled to the first fiber and situated to receive the modified optical beam, the second fiber having a second refractive index profile selected to maintain at least one beam characteristic of the modified optical beam. In some examples, the fiber shaping surface is a major surface of a flexible plate, and the flexible plate includes an ionic-polymer composite. In other alternatives, a piezo-bending actuator is used that can include one or more piezoelectric plates bonded together. Typically, a first electrode and a second electrode are situated so that at least a portion of the ionic polymer is situated between the first electrode and the second electrode. In some examples, the first electrode and the second electrode are conductive layers that substantially cover the first major surface and the second major surface, and the bend controller is an electrical voltage source. In further examples, a second set of electrodes is situated about the ionic polymer and a sensor is coupled to the second set of electrodes to detect deformation of the flexible plate. The bend controller is coupled to the sensor and establishes a voltage applied to the ionic polymer based on a voltage detected by the second set of electrodes.

According to some examples, the first fiber is situated to as to extend along a direction of the curvature of the fiber shaping surface. In other examples, the first fiber comprises one or more elongated loops and the section of the fiber conforming to the fiber shaping surface includes elongated portions of the loops situated to extend in the direction of the curvature of the fiber shaping surface. In other embodiments, a displacement member is coupled to the flexible plate to vary the curvature of the fiber shaping surface by pushing against the flexible plate or pulling the flexible plate. In typical examples, the flexible plate is secured at two locations and the displacement member is coupled to the flexible plate between the two locations. In representative embodiments, the flexible plate is secured at respective ends along a direction of the curvature of the fiber shaping surface. According to some examples, the fiber shaping surface has a fixed curvature, and is a surface of a ring, a surface of a section of a ring, or an outer surface of a cylinder such as a right circular cylinder.

In some examples, the bend controller is situated to vary the length of the section of the first fiber that conforms to the fiber shaping surface. In additional examples, a guide is slidably secured with respect to the flexible surface and situated to engage the fiber so that the length of the section of the first fiber that is urged to conform to the fiber shaping surface is variable in response to movement of the guide along the fiber shaping surface. In some examples, the guide includes a groove that engages the first fiber. In still further embodiments, a connecting member is rotatably secured at an axis of rotation and secured to the guide so that rotation of the guide about the axis urges the guide along the fiber shaping surface. According to additional examples, the fiber shaping surface has a compound curvature that includes a plurality of circular curvatures, and the axis of rotation corresponds to a center of curvature of one of the plurality of the circular curvatures.

According to some examples, the fiber shaping surface is defined by a portion of a mandrel surface and the bend controller comprises a jaw situated to urge the first length of fiber toward the portion of the mandrel surface and the first fiber forms at least a portion of a loop situated about the mandrel. In some cases, the bend controller includes a stage situated to urge the mandrel towards the first length of fiber. In additional examples, the first fiber and the second fiber form at least the portion of the loop. A splice couples the first fiber and the second fiber and the jaw is situated to urge the first length of fiber, a portion of the second fiber, and the splice toward the portion of the mandrel surface. In still further examples, the jaw comprises a first jaw and a second jaw oppositely situated with respect to a displacement axis of the stage. The first jaw and the second jaw are coupled to a first elastic member and a second elastic member each situated to urge a respective jaw surface toward the mandrel surface. In other examples, the bend controller is configured to urge the mandrel toward the first jaw surface and the second jaw surface so as to select the section of the first fiber that is urged to conform to the fiber shaping surface, a section of the second fiber that is urged to conform to the fiber shaping surface, and a curvature of at least a portion of the loop that does not contact either the fiber bending surface, the first, jaw, or the second jaw.

In some examples, fiber sections are secured at one or two end points, or formed in curved, looped, or straight sections, and one or more surfaces such as surfaces of pins, rods, or spheres contact the fiber sections, and a fiber is bent in response. In some examples, the fiber sections are urged toward such a surface, or the surface is urged toward the fiber section, or both are movable toward each other.

The foregoing and other objects, features, and advantages of the disclosed technology will become more apparent from the following detailed description, which proceeds with reference to the accompanying figures.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

FIG. 25 illustrates an example process for adjusting and maintaining modified characteristics of an optical beam.

FIG. 32 illustrates a representative fiber shaping surface.

FIGS. 33A-33B illustrate another beam perturbation device that includes a fiber bending mechanism.

FIG. 34 illustrates another beam perturbation device that includes a fiber bending mechanism having a fiber shaping surface on a section of a disc.

FIG. 35 illustrates another beam perturbation device that includes a fiber bending mechanism having a fiber shaping surface on a portion of a ring.

FIGS. 38A-38B illustrate a VBC apparatus that includes optical fiber bending mechanism that urges a selected length of an optical fiber so as to contact oppositely situated jaws.

FIGS. 39A-39D illustrate operation of the optical fiber bending mechanism of FIGS. 38A-38B.

FIG. 42 illustrates another VBC apparatus that includes a flexure to which an optical fiber is secured.

FIGS. 43A-43B illustrate a spool that permits bending of selectable lengths of fiber.

DETAILED DESCRIPTION

Figure 1:
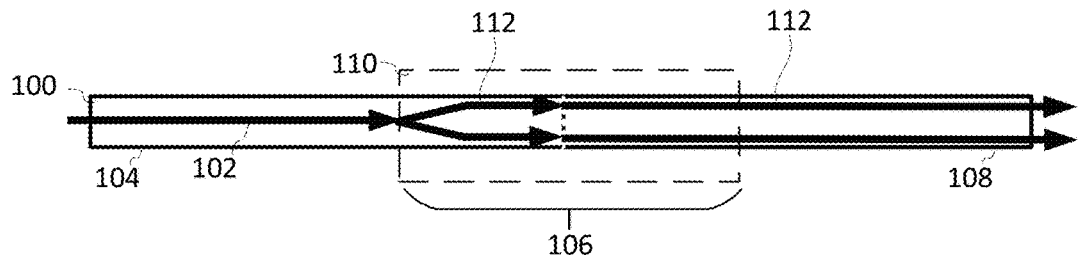
FIG. 1 illustrates an example fiber structure for providing a laser beam having variable beam characteristics.

As used herein throughout this disclosure and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Also, the terms "modify" and "adjust" are used interchangeably to mean "alter."

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Definitions

Definitions of words and terms as used herein:
1. The term "beam characteristics" refers to one or more of the following terms used to describe an optical beam. In general, the beam characteristics of most interest depend on the specifics of the application or optical system.
2. The term "beam diameter" is defined as the distance across the center of the beam along an axis for which the irradiance (intensity) equals $1/e^2$ of the maximum irradiance. While examples disclosed herein generally use beams that propagate in azimuthally symmetric modes, elliptical or other beam shapes can be used, and beam diameter can be different along different axes. Circular beams are characterized by a single beam diameter. Other beam shapes can have different beam diameters along different axes.
3. The term "spot size" is the radial distance (radius) from the center point of maximum irradiance to the $1/e^2$ point.
4. The term "beam divergence distribution" is the power vs the full cone angle. This quantity is sometimes called the "angular distribution" or "NA distribution."
5. The term "beam parameter product" (BPP) of a laser beam is defined as the product of the beam radius (measured at the beam waist) and the beam divergence half-angle (measured in the far field). The units of BPP are typically mm-mrad.
6. A "confinement fiber" is defined to be a fiber that possesses one or more confinement regions, wherein a confinement region comprises a higher-index region (core region) surrounded by a lower-index region (cladding region). The RIP of a confinement fiber may include one or more higher-index regions (core regions) surrounded by lower-index regions (cladding regions), wherein light is guided in the higher-index regions. Each confinement region and each cladding region can have any RIP, including but not limited to step-index and graded-index. The confinement regions may or may not be concentric and may be a variety of shapes such as circular, annular, polygonal, arcuate, elliptical, or irregular, or the like or any combination thereof. The confinement regions in a particular confinement fiber may all have the same shape or may be different shapes. Moreover, confinement regions may be co-axial or may have offset axes with respect to one another. Confinement regions may be of uniform thickness about a central axis in the longitudinal direction, or the thicknesses may vary about the central axis in the longitudinal direction.
7. The term "intensity distribution" refers to optical intensity as a function of position along a line (1D profile) or on a plane (2D profile). The line or plane is usually taken perpendicular to the propagation direction of the light. It is a quantitative property.
8. "Luminance" is a photometric measure of the luminous intensity per unit area of light travelling in a given direction.
9. "$M^2$ factor" (also called "beam quality factor" or "beam propagation factor") is a dimensionless parameter for quantifying the beam quality of laser beams, with $M^2=1$ being a diffraction-limited beam, and larger M2 values corresponding to lower beam quality. $M^2$ is equal to the BPP divided by $\lambda/\pi$, where $\lambda$ is the wavelength of the beam in microns (if BPP is expressed in units of mm-mrad).
10. The term "numerical aperture" or "NA" of an optical system is a dimensionless number that characterizes the range of angles over which the system can accept or emit light.
11. The term "optical intensity" is not an official (SI) unit, but is used to denote incident power per unit area on a surface or passing through a plane.
12. The term "power density" refers to optical power per unit area, although this is also referred to as "optical intensity."

13. The term "radial beam position" refers to the position of a beam in a fiber measured with respect to the center of the fiber core in a direction perpendicular to the fiber axis.
14. "Radiance" is the radiation emitted per unit solid angle in a given direction by a unit area of an optical source (e.g., a laser). Radiance may be altered by changing the beam intensity distribution and/or beam divergence profile or distribution. The ability to vary the radiance profile of a laser beam implies the ability to vary the BPP.
15. The term "refractive-index profile" or "RIP" refers to the refractive index as a function of position along a line (1D) or in a plane (2D) perpendicular to the fiber axis. Many fibers are azimuthally symmetric, in which case the 1D RIP is identical for any azimuthal angle.
16. A "step-index fiber" has a RIP that is flat (refractive index independent of position) within the fiber core.
17. A "graded-index fiber" has a RIP in which the refractive index decreases with increasing radial position (i.e., with increasing distance from the center of the fiber core).
18. A "parabolic-index fiber" is a specific case of a graded-index fiber in which the refractive index decreases quadratically with increasing distance from the center of the fiber core.
19. "Free space propagation" and "unguided propagation" are used to refer to optical beams that propagate without being constrained to one or more waveguides (such as optical fibers) over optical distances that are typically 5, 10, 20, 100 times or more than a beam Rayleigh range. Such propagation can be in optical media such as glass, fused silica, semiconductors, air, crystalline materials, or vacuum.
20. "Collimated beams" are generally produced by situating a lens or other focusing element such as a curved mirror, a Fresnel lens, or a holographic optical element such that an apparent distance from a location at which a beam has, would have, or appears to have a planar wavefront (such as at a focus of a Gaussian beam or at an output of an optical fiber) that is less than 10%, 5%, 2%, 1%, 0.5%, 0.1% of a focal length f from a focal point of a focal length f.

Fiber for Varying Beam Characteristics

Disclosed herein are methods, systems, and apparatus configured to provide a fiber operable to provide a laser beam having variable beam characteristics (VBC) that may reduce cost, complexity, optical loss, or other drawbacks of the conventional methods described above. This VBC fiber is configured to vary a wide variety of optical beam characteristics. Such beam characteristics can be controlled using the VBC fiber thus allowing users to tune various beam characteristics to suit the particular requirements of an extensive variety of laser processing applications. For example, a VBC fiber may be used to tune: beam diameter, beam divergence distribution, BPP, intensity distribution, $M^2$ factor, NA, optical intensity, power density, radial beam position, radiance, spot size, or the like, or any combination thereof.

In general, the disclosed technology entails coupling a laser beam into a fiber in which the characteristics of the laser beam in the fiber can be adjusted by perturbing the laser beam and/or perturbing a first length of fiber by any of a variety of methods (e.g., bending the fiber or introducing one or more other perturbations) and fully or partially maintaining adjusted beam characteristics in a second length of fiber. The second length of fiber is specially configured to maintain and/or further modify the adjusted beam characteristics. In some cases, the second length of fiber preserves the adjusted beam characteristics through delivery of the laser beam to its ultimate use (e.g., materials processing). The first and second lengths of fiber may comprise the same or different fibers.

The disclosed technology is compatible with fiber lasers and fiber-coupled lasers. Fiber-coupled lasers typically deliver an output via a delivery fiber having a step-index refractive index profile (RIP), i.e., a flat or constant refractive index within the fiber core. In reality, the RIP of the delivery fiber may not be perfectly flat, depending on the design of the fiber. Important parameters are the fiber core diameter ($d_{core}$) and NA. The core diameter is typically in the range of 10-1000 micron (although other values are possible), and the NA is typically in the range of 0.06-0.22 (although other values are possible). A delivery fiber from the laser may be routed directly to the process head or work piece, or it may be routed to a fiber-to-fiber coupler (FFC) or fiber-to-fiber switch (FFS), which couples the light from the delivery fiber into a process fiber that transmits the beam to the process head or the work piece.

Most materials processing tools, especially those at high power (>1 kW), employ multimode (MM) fiber, but some employ single-mode (SM) fiber, which is at the lower end of the $d_{core}$ and NA ranges. The beam characteristics from a SM fiber are uniquely determined by the fiber parameters. The beam characteristics from a MM fiber, however, can vary (unit-to-unit and/or as a function of laser power and time), depending on the beam characteristics from the laser source(s) coupled into the fiber, the launching or splicing conditions into the fiber, the fiber RIP, and the static and dynamic geometry of the fiber (bending, coiling, motion, micro-bending, etc.). For both SM and MM delivery fibers, the beam characteristics may not be optimum for a given materials processing task, and it is unlikely to be optimum for a range of tasks, motivating the desire to be able to systematically vary the beam characteristics in order to customize or optimize them for a particular processing task.

In one example, the VBC fiber may have a first length and a second length and may be configured to be interposed as an in-fiber device between the delivery fiber and the process head to provide the desired adjustability of the beam characteristics. To enable adjustment of the beam, a perturbation device and/or assembly is disposed in close proximity to and/or coupled with the VBC fiber and is responsible for perturbing the beam in a first length such that the beam's characteristics are altered in the first length of fiber, and the altered characteristics are preserved or further altered as the beam propagates in the second length of fiber. The perturbed beam is launched into a second length of the VBC fiber configured to conserve adjusted beam characteristics. The first and second lengths of fiber may be the same or different fibers and/or the second length of fiber may comprise a confinement fiber. The beam characteristics that are conserved by the second length of VBC fiber may include any of: beam diameter, beam divergence distribution, BPP, intensity distribution, luminance, $M^2$ factor, NA, optical intensity, power density, radial beam position, radiance, spot size, or the like, or any combination thereof.

In some disclosed embodiments, a fiber is referred to a being urged to conform to a surface. Unless otherwise indicated, such a fiber need not contact such a surface nor acquire a curvature corresponding to the surface.

FIG. 1 illustrates an example VBC fiber 100 for providing a laser beam having variable beam characteristics without requiring the use of free-space optics to change the beam characteristics. VBC fiber 100 comprises a first length of fiber 104 and a second length of fiber 108. First length of fiber 104 and second length of fiber 108 may be the same or different fibers and may have the same or different RIPs. The first length of fiber 104 and the second length of fiber 108 may be joined together by a splice. First length of fiber 104 and second length of fiber 108 may be coupled in other ways, may be spaced apart, or may be connected via an interposing component such as another length of fiber, free-space optics, glue, index-matching material, or the like or any combination thereof.

A perturbation device 110 is disposed proximal to and/or envelops perturbation region 106. Perturbation device 110 may be a device, assembly, in-fiber structure, and/or other feature. Perturbation device 110 at least perturbs optical beam 102 in first length of fiber 104 or second length of fiber 108 or a combination thereof in order to adjust one or more beam characteristics of optical beam 102. Adjustment of beam 102 responsive to perturbation by perturbation device 110 may occur in first length of fiber 104 or second length of fiber 108 or a combination thereof. Perturbation region 106 may extend over various widths and may or may not extend into a portion of second length of fiber 108. As beam 102 propagates in VBC fiber 100, perturbation device 110 may physically act on VBC fiber 100 to perturb the fiber and adjust the characteristics of beam 102. Alternatively, perturbation device 110 may act directly on beam 102 to alter its beam characteristics. Subsequent to being adjusted, perturbed beam 112 has different beam characteristics than beam 102, which will be fully or partially conserved in second length of fiber 108. In another example, perturbation device 110 need not be disposed near a splice. Moreover, a splice may not be needed at all, for example VBC fiber 100 may be a single fiber, first length of fiber and second length of fiber could be spaced apart, or secured with a small gap (air-spaced or filled with an optical material, such as optical cement or an index-matching material).

Perturbed beam 112 is launched into second length of fiber 108, where perturbed beam 112 characteristics are largely maintained or continue to evolve as perturbed beam 112 propagates yielding the adjusted beam characteristics at the output of second length of fiber 108. In one example, the new beam characteristics may include an adjusted intensity distribution. In an example, an altered beam intensity distribution will be conserved in various structurally bounded confinement regions of second length of fiber 108. Thus, the beam intensity distribution may be tuned to a desired beam intensity distribution optimized for a particular laser processing task. In general, the intensity distribution of perturbed beam 112 will evolve as it propagates in the second length of fiber 108 to fill the confinement region(s) into which perturbed beam 112 is launched responsive to conditions in first length of fiber 104 and perturbation caused by perturbation device 110. In addition, the angular distribution may evolve as the beam propagates in the second fiber, depending on launch conditions and fiber characteristics. In general, fibers largely preserve the input divergence distribution, but the distribution can be broadened if the input divergence distribution is narrow and/or if the fiber has irregularities or deliberate features that perturb the divergence distribution. The various confinement regions, perturbations, and fiber features of second length of fiber 108 are described in greater detail below. Beams 102 and 112 are conceptual abstractions intended to illustrate how a beam may propagate through a VBC fiber 100 for providing variable beam characteristics and are not intended to closely model the behavior of a particular optical beam.

VBC fiber 100 may be manufactured by a variety of methods including PCVD (Plasma Chemical Vapor Deposition), OVD (Outside Vapor Deposition), VAD (Vapor Axial Deposition), MOCVD (Metal-Organic Chemical Vapor Deposition.) and/or DND (Direct Nanoparticle Deposition). VBC fiber 100 may comprise a variety of materials. For example, VBC fiber 100 may comprise $SiO_2$, $SiO_2$ doped with $GeO_2$, germanosilicate, phosphorus pentoxide, phosphosilicate, $Al_2O_3$, aluminosilicate, or the like or any combinations thereof. Confinement regions may be bounded by cladding doped with fluorine, boron, or the like or any combinations thereof. Other dopants may be added to active fibers, including rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like or any combination thereof. Confinement regions may be bounded by cladding having a lower index than the confinement region with fluorine or boron doping. Alternatively, VBC fiber 100 may comprise photonic crystal fibers or micro-structured fibers.

VBC fiber 100 is suitable for use in any of a variety of fiber, fiber optic, or fiber laser devices, including continuous wave and pulsed fiber lasers, disk lasers, solid state lasers, or diode lasers (pulse rate unlimited except by physical constraints). Furthermore, implementations in a planar waveguide or other types of waveguides and not just fibers are within the scope of the claimed technology.

Figure 2:
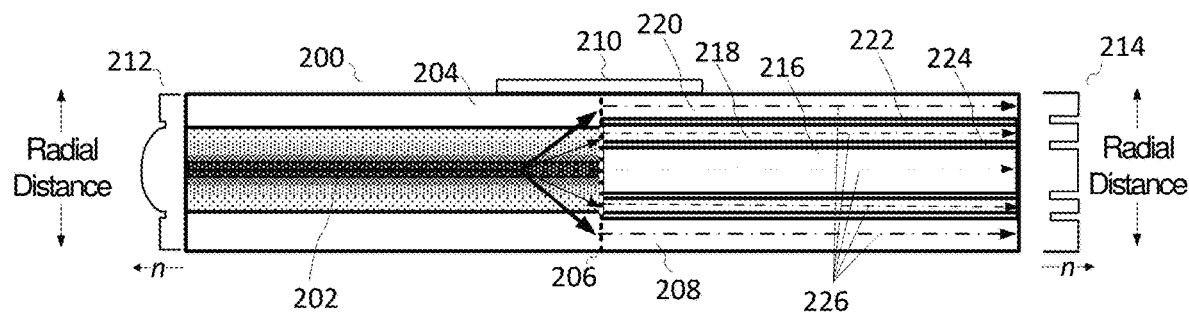
FIG. 2 depicts a cross-sectional view of an example fiber structure for delivering a beam with variable beam characteristics.

FIG. 2 depicts a cross-sectional view of an example VBC fiber 200 for adjusting beam characteristics of an optical beam. In an example, VBC fiber 200 may be a process fiber because it may deliver the beam to a process head for material processing. VBC fiber 200 comprises a first length of fiber 204 spliced at junction 206 to a second length of fiber 208. A perturbation assembly 210 is disposed proximal to junction 206. Perturbation assembly 210 may be any of a variety of devices configured to enable adjustment of the beam characteristics of an optical beam 202 propagating in VBC fiber 200. In an example, perturbation assembly 210 may be a mandrel and/or another device that may provide means of varying the bend radius and/or bend length of VBC fiber 200 near the splice. Other examples of perturbation devices are discussed below with respect to FIG. 24.

In an example, first length of fiber 204 has a parabolic-index RIP 212 as indicated by the left RIP graph. Most of the intensity distribution of beam 202 is concentrated in the center of fiber 204 when fiber 204 is straight or nearly straight. Second length of fiber 208 is a confinement fiber having RIP 214 as shown in the right RIP graph. Second length of fiber 208 includes confinement regions 216, 218 and 220. Confinement region 216 is a central core surrounded by two annular (or ring-shaped) confinement regions 218 and 220. Layers 222 and 224 are structural barriers of lower index material between confinement regions (216, 218 and 220), commonly referred to as "cladding" regions. In one example, layers 222 and 224 may comprise rings of fluorosilicate; in some embodiments, the fluorosilicate cladding layers are relatively thin. Other materials may be used as well and claimed subject matter is not limited in this regard.

In an example, as beam 202 propagates along VBC fiber 200, perturbation assembly 210 may physically act on fiber 208 and/or beam 202 to adjust its beam characteristics and generate adjusted beam 226. In the current example, the intensity distribution of beam 202 is modified by perturbation assembly 210. Subsequent to adjustment of beam 202 the intensity distribution of adjusted beam 226 may be concentrated in outer confinement regions 218 and 220 with relatively little intensity in the central confinement region 216. Because each of confinement regions 216, 218, and/or 220 is isolated by the thin layers of lower index material in barrier layers 222 and 224, second length of fiber 208 can substantially maintain the adjusted intensity distribution of adjusted beam 226. The beam will typically become distributed azimuthally within a given confinement region but will not transition (significantly) between the confinement regions as it propagates along the second length of fiber 208. Thus, the adjusted beam characteristics of adjusted beam 226 are largely conserved within the isolated confinement regions 216, 218, and/or 220. In some cases, it be may desirable to have the beam 226 power divided among the confinement regions 216, 218, and/or 220 rather than concentrated in a single region, and this condition may be achieved by generating an appropriately adjusted beam 226.

In one example, core confinement region 216 and annular confinement regions 218 and 220 may be composed of fused silica glass, and cladding 222 and 224 defining the confinement regions may be composed of fluorosilicate glass. Other materials may be used to form the various confinement regions (216, 218 and 220), including germanosilicate, phosphosilicate, aluminosilicate, or the like, or a combination thereof and claimed subject matter is not so limited. Other materials may be used to form the barrier rings (222 and 224), including fused silica, borosilicate, or the like or a combination thereof, and claimed subject matter is not so limited. In other embodiments, the optical fibers or waveguides include or are composed of various polymers or plastics or crystalline materials. Generally, the core confinement regions have refractive indices that are greater than the refractive indices of adjacent barrier/cladding regions.

In some examples, it may be desirable to increase a number of confinement regions in a second length of fiber to increase granularity of beam control over beam displacements for fine-tuning a beam profile. For example, confinement regions may be configured to provide stepwise beam displacement.

Figure 3:
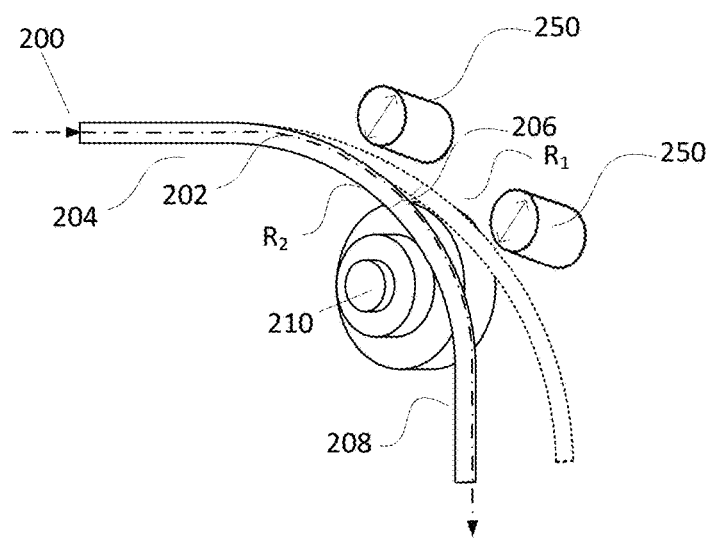
FIG. 3 illustrates an example method of perturbing a fiber structure for providing a beam having variable beam characteristics.

FIG. 3 illustrates an example method of perturbing fiber 200 for providing variable beam characteristics of an optical beam. Changing the bend radius of a fiber may change the radial beam position, divergence angle, and/or radiance profile of a beam within the fiber. The bend radius of VBC fiber 200 can be decreased from a first bend radius $R_1$ to a second bend radius $R_2$ about splice junction 206 by using a stepped mandrel or cone as the perturbation assembly 210. Additionally or alternatively, the engagement length on the mandrel(s) or cone can be varied. Rollers 250 may be employed to engage VBC fiber 200 across perturbation assembly 210. In an example, an amount of engagement of rollers 250 with fiber 200 has been shown to shift the distribution of the intensity profile to the outer confinement regions 218 and 220 of fiber 200 with a fixed mandrel radius. There are a variety of other methods for varying the bend radius of fiber 200, such as using a clamping assembly, flexible tubing, or the like, or a combination thereof, and claimed subject matter is not limited in this regard. In another example, for a particular bend radius the length over which VBC fiber 200 is bent can also vary beam characteristics in a controlled and reproducible way. In examples, changing the bend radius and/or length over which the fiber is bent at a particular bend radius also modifies the intensity distribution of the beam such that one or more modes may be shifted radially away from the center of a fiber core.

Maintaining the bend radius of the fibers across junction 206 ensures that the adjusted beam characteristics such as radial beam position and radiance profile of optical beam 202 will not return to beam 202's unperturbed state before being launched into second length of fiber 208. Moreover, the adjusted radial beam characteristics, including position, divergence angle, and/or intensity distribution, of adjusted beam 226 can be varied based on an extent of decrease in the bend radius and/or the extent of the bent length of VBC fiber 200. Thus, specific beam characteristics may be obtained using this method.

In the current example, first length of fiber 204 having first RIP 212 is spliced at junction 206 to a second length of fiber 208 having a second RIP 214. However, it is possible to use a single fiber having a single RIP formed to enable perturbation (e.g., by micro-bending) of the beam characteristics of beam 202 and also to enable conservation of the adjusted beam. Such a RIP may be similar to the RIPs shown in fibers illustrated in FIGS. 17, 18, and/or 19.

Figure 4:
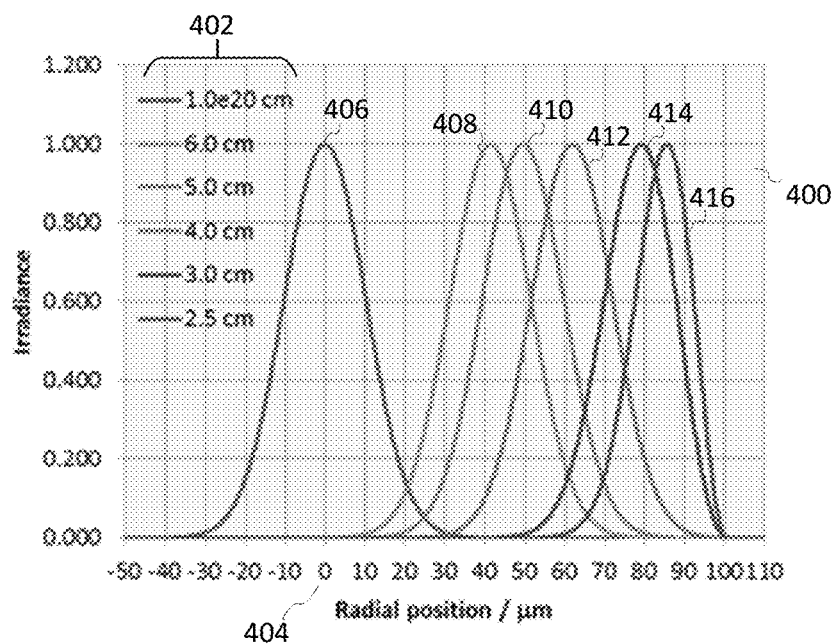
FIG. 4 is a graph illustrating the calculated spatial profile of the lowest-order mode ($LP_{01}$) for a first length of a fiber for different fiber bend radii.
Figure 5:
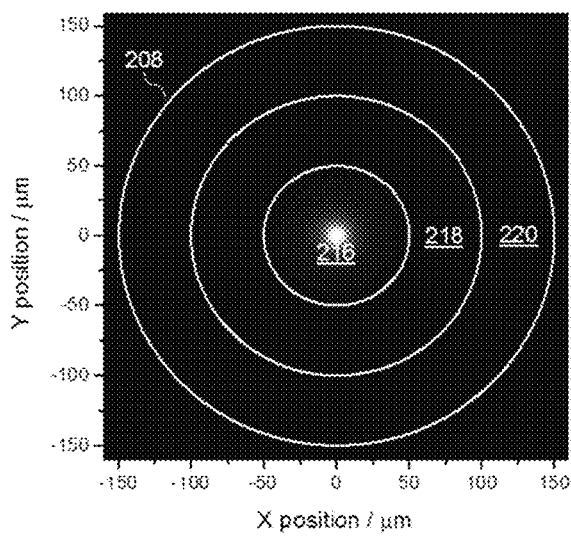
FIG. 5 illustrates an example of a two-dimensional intensity distribution at a junction when a fiber for varying beam characteristics is nearly straight.
Figure 6:
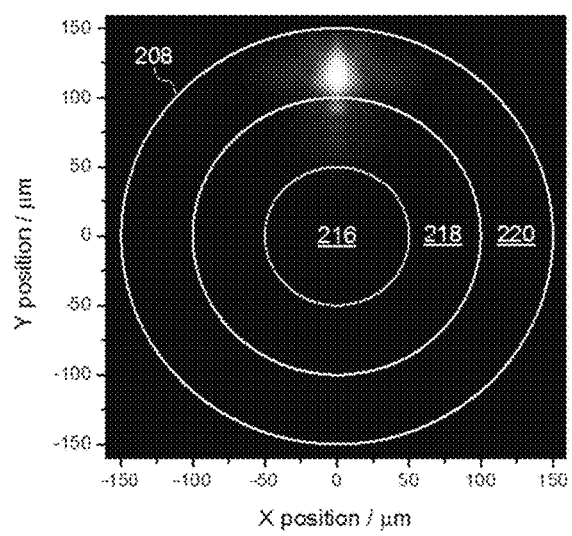
FIG. 6 illustrates an example of a two-dimensional intensity distribution at a junction when a fiber for varying beam characteristics is bent with a radius chosen to preferentially excite a particular confinement region of a second length of fiber.

FIGS. 7-10 provide experimental results for VBC fiber 200 (shown in FIGS. 2 and 3) and illustrate further a beam response to perturbation of VBC fiber 200 when a perturbation assembly 210 acts on VBC fiber 200 to bend the fiber. FIGS. 4-6 are simulations and FIGS. 7-10 are experimental results wherein a beam from a SM 1050 nm source was launched into an input fiber (not shown) with a 40 micron core diameter. The input fiber was spliced to first length of fiber 204.

FIG. 4 is an example graph 400 illustrating the calculated profile of the lowest-order mode ($LP_{01}$) for a first length of fiber 204 for different fiber bend radii 402, wherein a perturbation assembly 210 involves bending VBC fiber 200. As the fiber bend radius is decreased, an optical beam propagating in VBC fiber 200 is adjusted such that the mode shifts radially away from the center 404 of a VBC fiber 200 core (r=0 micron) toward the core/cladding interface (located at r=100 micron in this example). Higher-order modes ($LP_{ln}$) also shift with bending. Thus, a straight or nearly straight fiber (very large bend radius), curve 406 for $LP_{01}$ is centered at or near the center of VBC fiber 200. At a bend radius of about 6 cm, curve 408 for $LP_{01}$ is shifted to a radial position of about 40 µm from the center 406 of VBC fiber 200. At a bend radius of about 5 cm, curve 410 for $LP_{01}$ is shifted to a radial position about 50 µm from the center 406 of VBC fiber 200. At a bend radius of about 4 cm, curve 412 for $LP_{01}$ is shifted to a radial position about 60 µm from the center 406 of VBC fiber 200. At a bend radius of about 3 cm, curve 414 for $LP_{01}$ is shifted to a radial position about 80 µm from the center 406 of VBC fiber 200. At a bend radius of about 2.5 cm, a curve 416 for $LP_{01}$ is shifted to a radial position about 85 µm from the center 406 of VBC fiber 200. Note that the shape of the mode remains relatively constant (until it approaches the edge of the core), which is a specific property of a parabolic RIP. Although, this property may be desirable in some situations, it is not required for the VBC functionality, and other RIPs may be employed.

In an example, if VBC fiber 200 is straightened, $LP_{01}$ mode will shift back toward the center of the fiber. Thus, the purpose of second length of fiber 208 is to "trap" or confine the adjusted intensity distribution of the beam in a confinement region that is displaced from the center of the VBC fiber 200. The splice between fibers 204 and 208 is included in the bent region, thus the shifted mode profile will be preferentially launched into one of the ring-shaped confinement regions 218 and 220 or be distributed among the confinement regions. FIGS. 5 and 6 illustrate this effect.

FIG. 5 illustrates an example two-dimensional intensity distribution at junction 206 within second length of fiber 208 when VBC fiber 200 is nearly straight. A significant portion of $LP_{01}$ and $LP_{ln}$ are within confinement region 216 of fiber 208. FIG. 6 illustrates the two-dimensional intensity distribution at junction 206 within second length of fiber 208 when VBC fiber 200 is bent with a radius chosen to preferentially excite confinement region 220 (the outermost confinement region) of second length of fiber 208. A significant portion of $LP_{01}$ and $LP_{ln}$ are within confinement region 220 of fiber 208.

In an example, second length of fiber 208 confinement region 216 has a 100 micron diameter, confinement region 218 is between 120 micron and 200 micron in diameter, and confinement region 220 is between 220 micron and 300 micron diameter. Confinement regions 216, 218, and 220 are separated by 10 um thick rings of fluorosilicate, providing an NA of 0.22 for the confinement regions. Other inner and outer diameters for the confinement regions, thicknesses of the rings separating the confinement regions, NA values for the confinement regions, and numbers of confinement regions may be employed.

Referring again to FIG. 5, with the noted parameters, when VBC fiber 200 is straight about 90% of the power is contained within the central confinement region 216, and about 100% of the power is contained within confinement regions 216 and 218. Referring now to FIG. 6, when fiber 200 is bent to preferentially excite second ring confinement region 220, nearly 75% of the power is contained within confinement region 220, and more than 95% of the power is contained within confinement regions 218 and 220. These calculations include $LP_{01}$ and two higher-order modes, which is typical in some 2-4 kW fiber lasers.

It is clear from FIGS. 5 and 6 that in the case where a perturbation assembly 210 acts on VBC fiber 200 to bend the fiber, the bend radius determines the spatial overlap of the modal intensity distribution of the first length of fiber 204 with the different guiding confinement regions (216, 218, and 220) of the second length of fiber 208. Changing the bend radius can thus change the intensity distribution at the output of the second length of fiber 208, thereby changing the diameter or spot size of the beam, and thus also changing its radiance and BPP value. This adjustment of the spot size may be accomplished in an all-fiber structure, involving no free-space optics and consequently may reduce or eliminate the disadvantages of free-space optics discussed above. Such adjustments can also be made with other perturbation assemblies that alter bend radius, bend length, fiber tension, temperature, or other perturbations discussed below.

In a typical materials processing system (e.g., a cutting or welding tool), the output of the process fiber is imaged at or near the work piece by the process head. Varying the intensity distribution as shown in FIGS. 5 and 6 thus enables variation of the beam profile at the work piece in order to tune and/or optimize the process, as desired. Specific RIPs for the two fibers were assumed for the purpose of the above calculations, but other RIPs are possible, and claimed subject matter is not limited in this regard.

FIGS. 7-10 depict experimental results (measured intensity distributions) to illustrate further output beams for various bend radii of VBC fiber 200 shown in FIG. 2.

Figure 7:
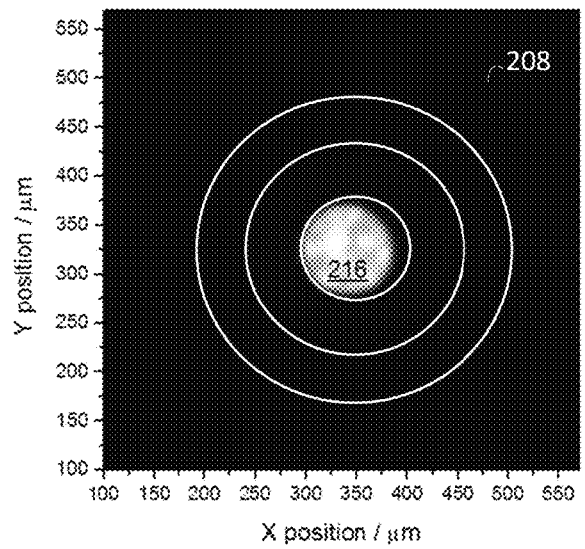
FIGS. 7-10 depict experimental results to illustrate further output beams for various bend radii of a fiber for varying beam characteristics shown in FIG. 2.
Figure 8:
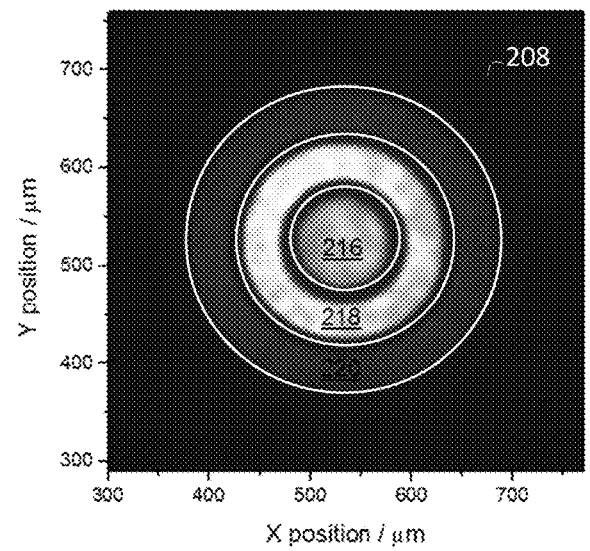
Figure 9:
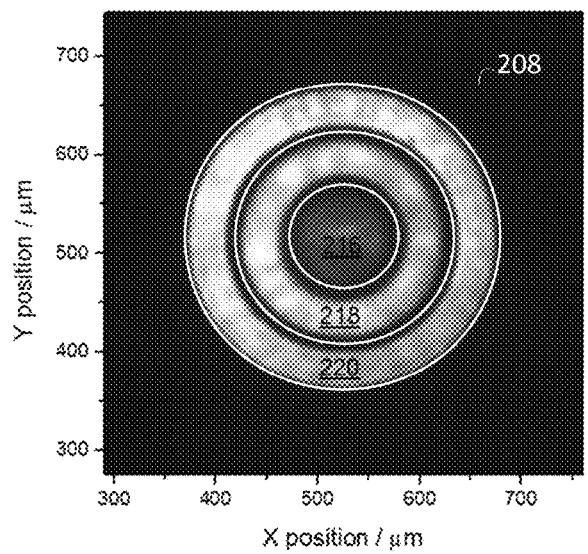
Figure 10:
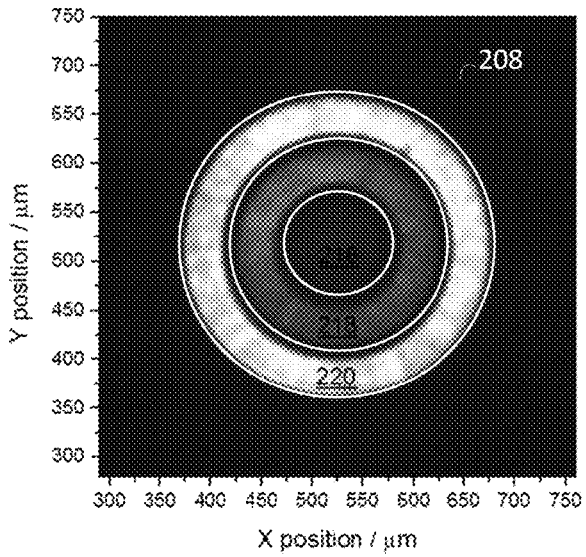

In FIG. 7 when VBC fiber 200 is straight, the beam is nearly completely confined to confinement region 216. As the bend radius is decreased, the intensity distribution shifts to higher diameters (FIGS. 8-10). FIG. 8 depicts the intensity distribution when the bend radius of VBC fiber 200 is chosen to shift the intensity distribution preferentially to confinement region 218. FIG. 9 depicts the experimental results when the bend radius is further reduced and chosen to shift the intensity distribution outward to confinement region 220 and confinement region 218. In FIG. 10, at the smallest bend radius, the beam is nearly a "donut mode", with most of the intensity in the outermost confinement region 220.

Despite excitation of the confinement regions from one side at the splice junction 206, the intensity distributions are nearly symmetric azimuthally because of scrambling within confinement regions as the beam propagates within the VBC fiber 200. Although the beam will typically scramble azimuthally as it propagates, various structures or perturbations (e.g., coils) could be included to facilitate this process.

For the fiber parameters used in the experiment shown in FIGS. 7-10, particular confinement regions were not exclusively excited because some intensity was present in multiple confinement regions. This feature may enable advantageous materials processing applications that are optimized by having a flatter or distributed beam intensity distribution. In applications requiring cleaner excitation of a given confinement region, different fiber RIPs could be employed to enable this feature.

The results shown in FIGS. 7-10 pertain to the particular fibers used in this experiment, and the details will vary depending on the specifics of the implementation. In particular, the spatial profile and divergence distribution of the output beam and their dependence on bend radius will depend on the specific RIPs employed, on the splice parameters, and on the characteristics of the laser source launched into the first fiber.

Different fiber parameters than those shown in FIG. 2 may be used and still be within the scope of the claimed subject matter. Specifically, different RIPs and core sizes and shapes may be used to facilitate compatibility with different input beam profiles and to enable different output beam characteristics. Example RIPs for the first length of fiber, in addition to the parabolic-index profile shown in FIG. 2, include other graded-index profiles, step-index, pedestal designs (i.e., nested cores with progressively lower refractive indices with increasing distance from the center of the fiber), and designs with nested cores with the same refractive index value but with various NA values for the central core and the surrounding rings. Example RIPs for the second length of fiber, in addition to the profile shown in FIG. 2, include confinement fibers with different numbers of confinement regions, non-uniform confinement-region thicknesses, different and/or non-uniform values for the thicknesses of the rings surrounding the confinement regions, different and/or non-uniform NA values for the confinement regions, different refractive-index values for the high-index and low-index portions of the RIP, non-circular confinement regions (such as elliptical, oval, polygonal, square, rectangular, or combinations thereof), as well as other designs as discussed in further detail with respect to FIGS. 26-28. Furthermore, VBC fiber 200 and other examples of a VBC fiber described herein are not restricted to use of two fibers. In some examples, implementation may include use of one fiber or more than two fibers. In some cases, the fiber(s) may not be axially uniform; for example, they could include fiber Bragg gratings or long-period gratings, or the diameter could vary along the length of the fiber. In addition, the fibers do not have to be azimuthally symmetric, e.g., the core(s) could have square or polygonal shapes. Various fiber coatings (buffers) may be employed, including high-index or index-matched coatings (which strip light at the glass-polymer interface) and low-index coatings (which guide light by total internal reflection at the glass-polymer interface). In some examples, multiple fiber coatings may be used on VBC fiber 200.

FIGS. 11-16 illustrate cross-sectional views of examples of first lengths of fiber for enabling adjustment of beam characteristics in a VBC fiber responsive to perturbation of an optical beam propagating in the first lengths of fiber. Some examples of beam characteristics that may be adjusted in the first length of fiber are: beam diameter, beam divergence distribution, BPP, intensity distribution, luminance, $M^2$ factor, NA, optical intensity profile, power density profile, radial beam position, radiance, spot size, or the like, or any combination thereof. The first lengths of fiber depicted in FIGS. 11-16 and described below are merely examples and do not provide an exhaustive recitation of the variety of first lengths of fiber that may be utilized to enable adjustment of beam characteristics in a VBC fiber assembly. Selection of materials, appropriate RIPs, and other variables for the first lengths of fiber illustrated in FIGS. 11-16 at least depend on a desired beam output. A wide variety of fiber variables are contemplated and are within the scope of the claimed subject matter. Thus, claimed subject matter is not limited by examples provided herein.

Figure 11:
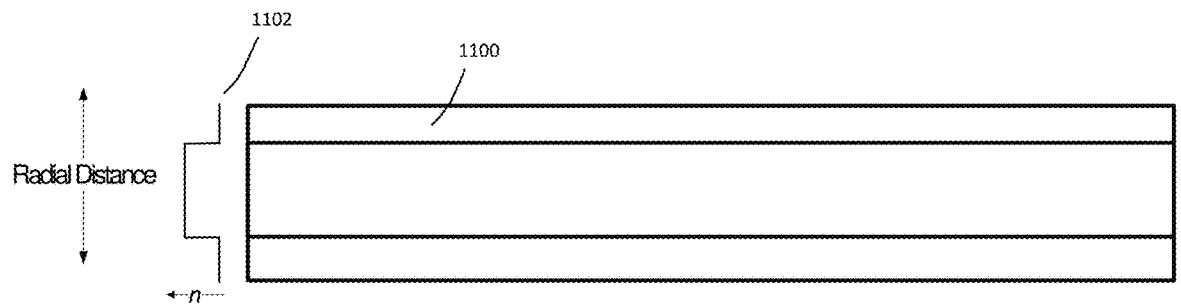
FIGS. 11-16 illustrate cross-sectional views of example first lengths of fiber for enabling adjustment of beam characteristics in a fiber assembly.
Figure 12:
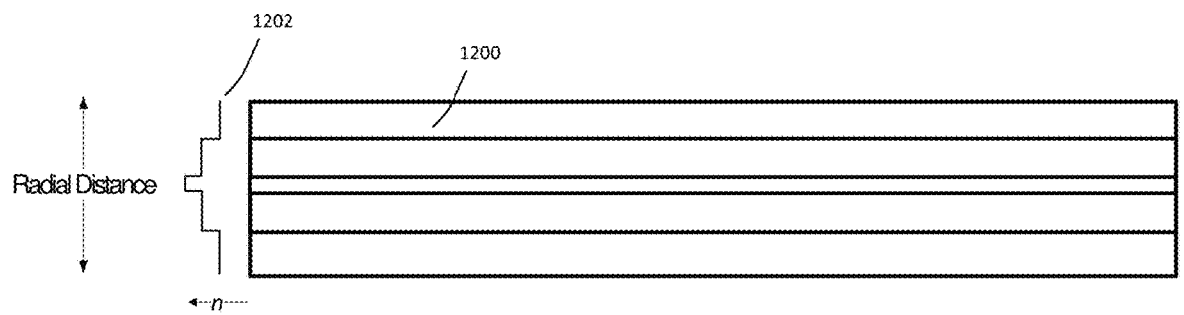
Figure 13:
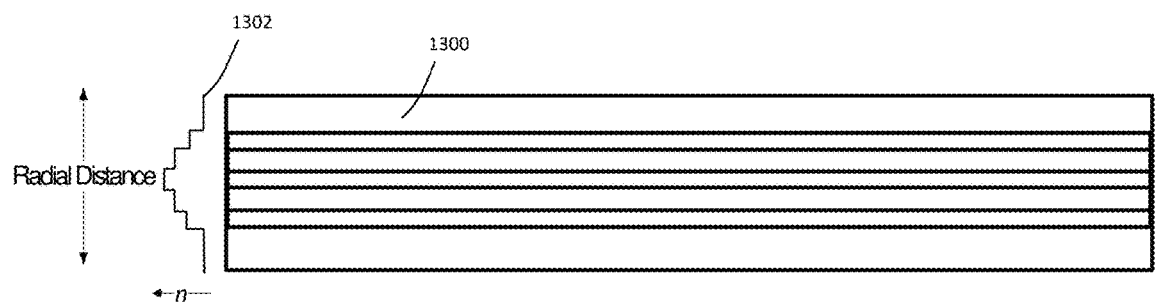

In FIG. 11 first length of fiber 1100 comprises a step-index profile 1102. FIG. 12 illustrates a first length of fiber 1200 comprising a "pedestal RIP" (i.e., a core comprising a step-index region surrounded by a larger step-index region) 1202. FIG. 13 illustrates first length of fiber 1300 comprising a multiple-pedestal RIP 1302.

Figure 14A:
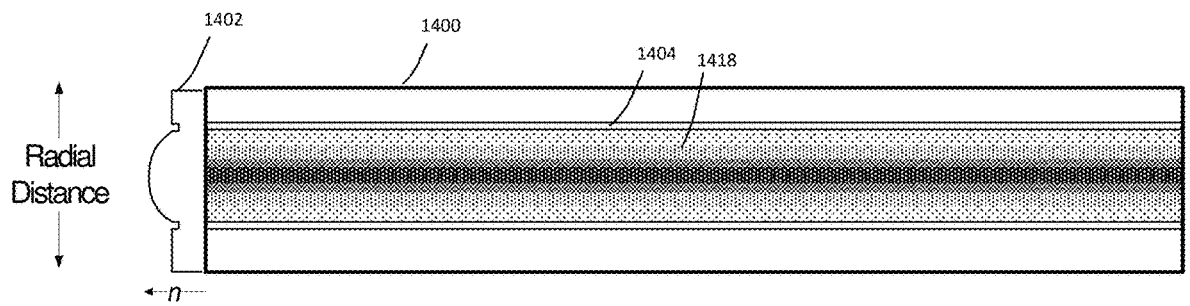

FIG. 14A illustrates first length of fiber 1400 comprising a graded-index profile 1418 surrounded by a down-doped region 1404. When the fiber 1400 is perturbed, modes may shift radially outward in fiber 1400 (e.g., during bending of fiber 1400). Graded-index profile 1402 may be designed to promote maintenance or even compression of modal shape. This design may promote adjustment of a beam propagating in fiber 1400 to generate a beam having a beam intensity distribution concentrated in an outer perimeter of the fiber (i.e., in a portion of the fiber core that is displaced from the fiber axis). As described above, when the adjusted beam is coupled into a second length of fiber having confinement regions, the intensity distribution of the adjusted beam may be trapped in the outermost confinement region, providing a donut shaped intensity distribution. A beam spot having a narrow outer confinement region may be useful to enable certain material processing actions.

Figure 14B:
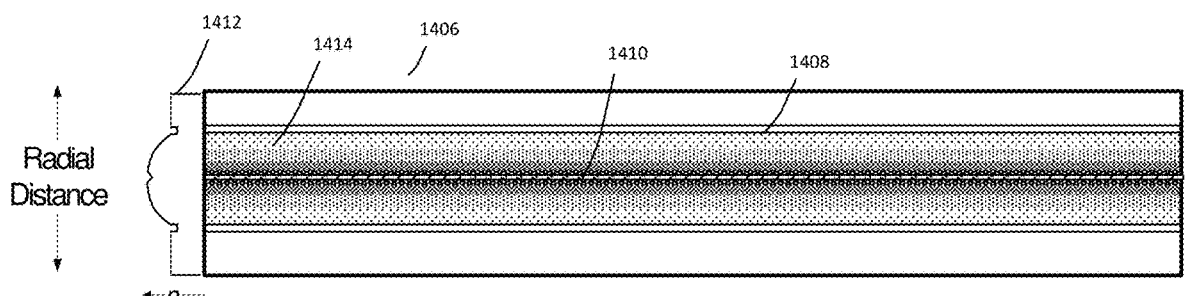

FIG. 14B illustrates first length of fiber 1406 comprising a graded-index profile 1414 surrounded by a down-doped region 1408 similar to fiber 1400. However, fiber 1406 includes a divergence structure 1410 (a lower-index region) as can be seen in profile 1412. The divergence structure 1410 is an area of material with a lower refractive index than that of the surrounding core. As the beam is launched into first length of fiber 1406, refraction from divergence structure 1410 causes the beam divergence to increase in first length of fiber 1406. The amount of increased divergence depends on the amount of spatial overlap of the beam with the divergence structure 1410 and the magnitude of the index difference between the divergence structure 1410 and the core material. Divergence structure 1410 can have a variety of shapes, depending on the input divergence distribution and desired output divergence distribution. In an example, divergence structure 1410 has a triangular or graded index shape.

Figure 15:
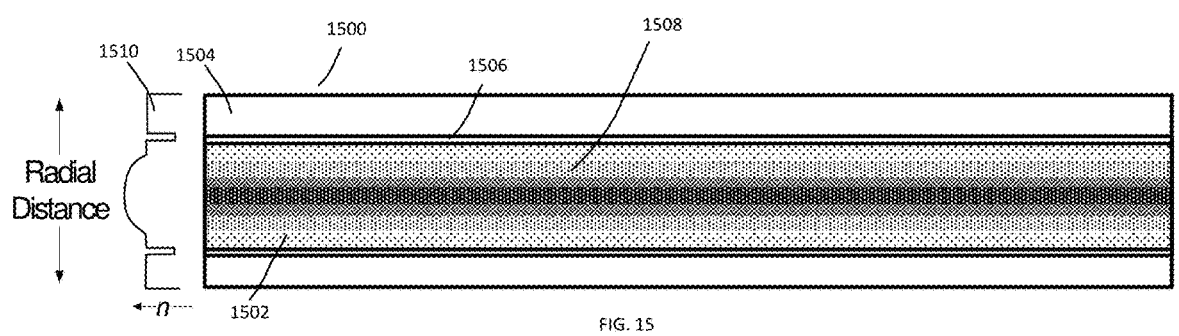

FIG. 15 illustrates a first length of fiber 1500 comprising a parabolic-index central region 1502 surrounded by a constant-index region 1504, and the constant-index region 1504 is surrounded by a lower-index annular layer 1506. The lower-index annulus 1506 helps guide a beam propagating in fiber 1500. When the propagating beam is perturbed, modes shift radially outward in fiber 1500 (e.g., during bending of fiber 1500). As one or more modes shift radially outward, parabolic-index region 1502 promotes retention of modal shape. When the modes reach the constant-index region of the RIP 1510, they will be compressed against the low-index ring 1506, which may cause preferential excitation of the outermost confinement region in the second fiber (in comparison to the first fiber RIP shown in FIG. 14). In one implementation, this fiber design works with a confinement fiber having a central step-index core and a single annular core. The parabolic-index portion 1502 of the RIP overlaps with the central step-index core of the confinement fiber. The constant-index portion 1504 overlaps with the annular core of the confinement fiber. The constant-index portion 1504 of the first fiber is intended to make it easier to move the beam into overlap with the annular core by bending. This fiber design also works with other designs of the confinement fiber.

Figure 16:
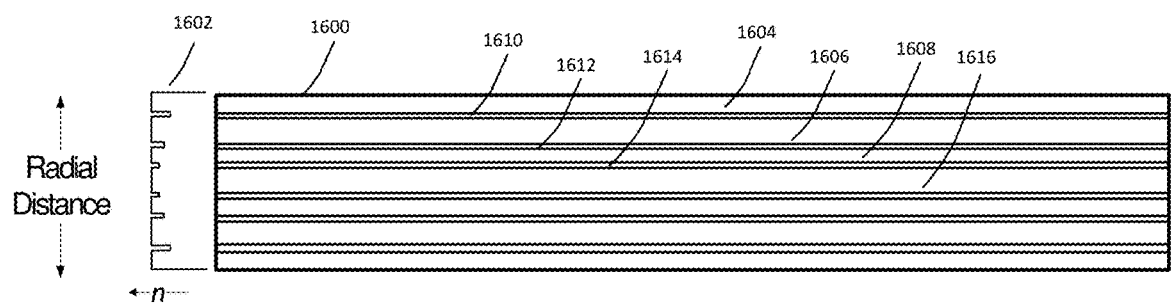

FIG. 16 illustrates a first length of fiber 1600 comprising guiding regions 1604, 1606, 1608, and 1616 bounded by lower-index layers 1610, 1612, and 1614 where the indexes of the lower-index layers 1610, 1612, and 1614 are stepped or, more generally, do not all have the same value. The stepped-index layers may serve to bound the beam intensity to certain guiding regions (1604, 1606, 1608, and 1616) when the perturbation assembly 210 (see FIG. 2) acts on the fiber 1600. In this way, adjusted beam light may be trapped in the guiding regions over a range of perturbation actions (such as over a range of bend radii, a range of bend lengths, a range of micro-bending pressures, and/or a range of acousto-optical signals), allowing for a certain degree of perturbation tolerance before a beam intensity distribution is shifted to a more distant radial position in fiber 1600. Thus, variation in beam characteristics may be controlled in a step-wise fashion. The radial widths of the guiding regions 1604, 1606, 1608, and 1616 may be adjusted to achieve a desired ring width, as may be required by an application. Also, a guiding region can have a thicker radial width to facilitate trapping of a larger fraction of the incoming beam profile if desired. Region 1606 is an example of such a design.

FIGS. 17-21 depict examples of fibers configured to enable maintenance and/or confinement of adjusted beam characteristics in the second length of fiber (e.g., fiber 208). These fiber designs are referred to as "ring-shaped confinement fibers" because they contain a central core surrounded by annular or ring-shaped cores. These designs are merely examples and not an exhaustive recitation of the variety of fiber RIPs that may be used to enable maintenance and/or confinement of adjusted beam characteristics within a fiber. Thus, claimed subject matter is not limited to the examples provided herein. Moreover, any of the first lengths of fiber described above with respect to FIGS. 11-16 may be combined with any of the second length of fiber described FIGS. 17-21.

Figure 17:
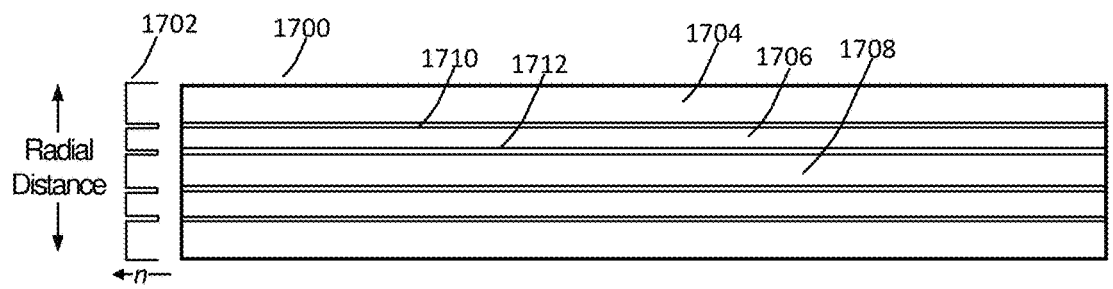
FIGS. 17-19 illustrate cross-sectional views of example second lengths of fiber ("confinement fibers") for confining adjusted beam characteristics in a fiber assembly.

FIG. 17 illustrates a cross-sectional view of an example second length of fiber for maintaining and/or confining adjusted beam characteristics in a VBC fiber assembly. As the perturbed beam is coupled from a first length of fiber to second length of fiber 1700, the second length of fiber 1700 may maintain at least a portion of the beam characteristics adjusted in response to perturbation in the first length of fiber within one or more of confinement regions 1704, 1706, and/or 1708. Fiber 1700 has a RIP 1702. Each of confinement regions 1704, 1706, and/or 1708 is bounded by a lower index layer 1710 and/or 1712. This design enables second length of fiber 1700 to maintain the adjusted beam characteristics. As a result, a beam output by fiber 1700 will substantially maintain the received adjusted beam as modified in the first length of fiber giving the output beam adjusted beam characteristics, which may be customized to a processing task or other application.

Figure 18:
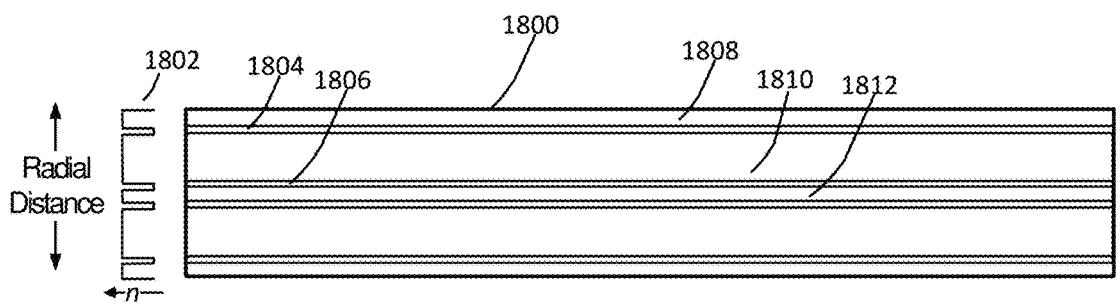

Similarly, FIG. 18 depicts a cross-sectional view of an example second length of fiber 1800 for maintaining and/or confining beam characteristics adjusted in response to perturbation in the first length of fiber in a VBC fiber assembly. Fiber 1800 has a RIP 1802. However, confinement regions 1808, 1810, and/or 1812 have different thicknesses than confinement regions 1704, 1706, and 1708. Each of confinement regions 1808, 1810, and/or 1812 is bounded by a lower index layer 1804 and/or 1806. Varying the thicknesses of the confinement regions (and/or barrier regions) enables tailoring or optimization of a confined adjusted radiance profile by selecting particular radial positions within which to confine an adjusted beam.

Figure 19:
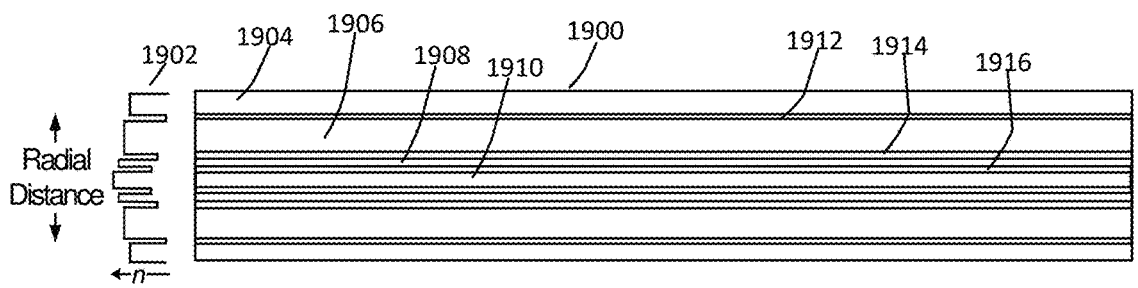

FIG. 19 depicts a cross-sectional view of an example second length of fiber 1900 having a RIP 1902 for maintaining and/or confining an adjusted beam in a VBC fiber assembly configured to provide variable beam characteristics. In this example, the number and thicknesses of confinement regions 1904, 1906, 1908, and 1910 are different from fiber 1700 and 1800 and the barrier layers 1912, 1914, and 1916 are of varied thicknesses as well. Furthermore, confinement regions 1904, 1906, 1908, and 1910 have different indexes of refraction and barrier layers 1912, 1914, and 1916 have different indexes of refraction as well. This design may further enable a more granular or optimized tailoring of the confinement and/or maintenance of an adjusted beam radiance to particular radial locations within fiber 1900. As the perturbed beam is launched from a first length of fiber to second length of fiber 1900 the modified beam characteristics of the beam (having an adjusted intensity distribution, radial position, and/or divergence angle, or the like, or a combination thereof) is confined within a specific radius by one or more of confinement regions 1904, 1906, 1908 and/or 1910 of second length of fiber 1900.

As noted previously, the divergence angle of a beam may be conserved or adjusted and then conserved in the second length of fiber. There are a variety of methods to change the divergence angle of a beam. The following are examples of fibers configured to enable adjustment of the divergence angle of a beam propagating from a first length of fiber to a second length of fiber in a fiber assembly for varying beam characteristics. However, these are merely examples and not an exhaustive recitation of the variety of methods that may be used to enable adjustment of divergence of a beam. Thus, claimed subject matter is not limited to the examples provided herein.

Figure 20:
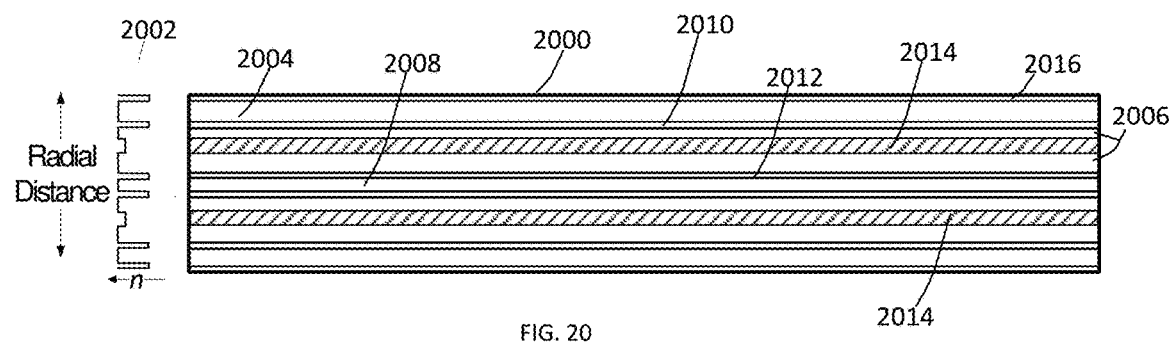
FIGS. 20 and 21 illustrate cross-sectional views of example second lengths of fiber for changing a divergence angle of and confining an adjusted beam in a fiber assembly configured to provide variable beam characteristics.

FIG. 20 depicts a cross-sectional view of an example second length of fiber 2000 having RIP 2002 for modifying, maintaining, and/or confining beam characteristics adjusted in response to perturbation in the first length of fiber. In this example, second length of fiber 2000 is similar to the previously described second lengths of fiber and forms a portion of the VBC fiber assembly for delivering variable beam characteristics as discussed above. There are three confinement regions 2004, 2006, and 2008 and three barrier layers 2010, 2012, and 2016. Second length of fiber 2000 also has a divergence structure 2014 situated within the confinement region 2006. The divergence structure 2014 is an area of material with a lower refractive index than that of the surrounding confinement region. As the beam is launched into second length of fiber 2000 refraction from divergence structure 2014 causes the beam divergence to increase in second length of fiber 2000. The amount of increased divergence depends on the amount of spatial overlap of the beam with the divergence structure 2014 and the magnitude of the index difference between the divergence structure 2014 and the core material. By adjusting the radial position of the beam near the launch point into the second length of fiber 2000, the divergence distribution may be varied. The adjusted divergence of the beam is conserved in fiber 2000, which is configured to deliver the adjusted beam to the process head, another optical system (e.g., fiber-to-fiber coupler or fiber-to-fiber switch), the work piece, or the like, or a combination thereof. In an example, divergence structure 2014 may have an index dip of about $10^{-5}$–$3\times10^{-2}$ with respect to the surrounding material. Other values of the index dip may be employed within the scope of this disclosure and claimed subject matter is not so limited.

Figure 21:
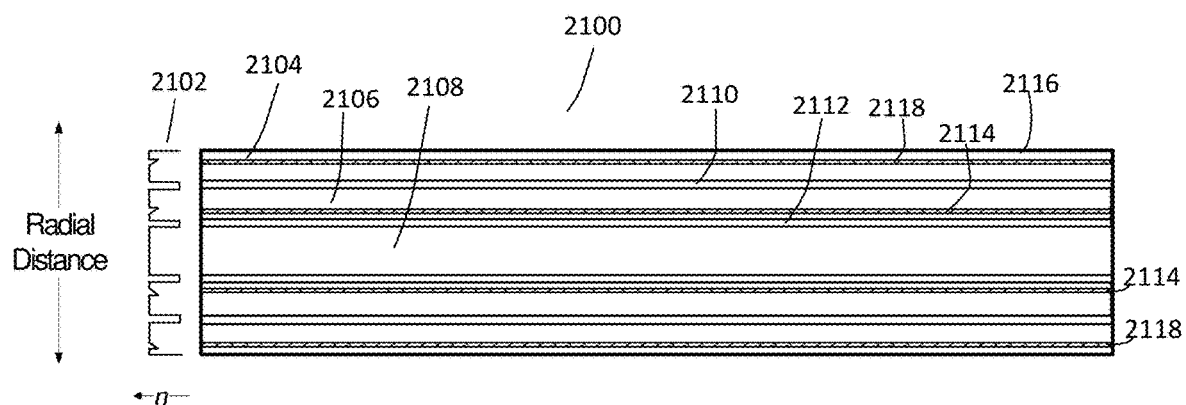

FIG. 21 depicts a cross-sectional view of an example second length of fiber 2100 having a RIP 2102 for modifying, maintaining, and/or confining beam characteristics adjusted in response to perturbation in the first length of fiber. Second length of fiber 2100 forms a portion of a VBC fiber assembly for delivering a beam having variable characteristics. In this example, there are three confinement regions 2104, 2106, and 2108 and three barrier layers 2110, 2112, and 2116. Second length of fiber 2100 also has a plurality of divergence structures 2114 and 2118. The divergence structures 2114 and 2118 are areas of graded lower index material. As the beam is launched from the first length fiber into second length of fiber 2100, refraction from divergence structures 2114 and 2118 causes the beam divergence to increase. The amount of increased divergence depends on the amount of spatial overlap of the beam with the divergence structure and the magnitude of the index difference between the divergence structure 2114 and/or 2118 and the surrounding core material of confinement regions 2106 and 2104 respectively. By adjusting the radial position of the beam near the launch point into the second length of fiber 2100, the divergence distribution may be varied. The design shown in FIG. 21 allows the intensity distribution and the divergence distribution to be varied somewhat independently by selecting both a particular confinement region and the divergence distribution within that conferment region (because each confinement region may include a divergence structure). The adjusted divergence of the beam is conserved in fiber 2100, which is configured to deliver the adjusted beam to the process head, another optical system, or the work piece. Forming the divergence structures 2114 and 2118 with a graded or non-constant index enables tuning of the divergence profile of the beam propagating in fiber 2100. An adjusted beam characteristic such as a radiance profile and/or divergence profile may be conserved as it is delivered to a process head by the second fiber. Alternatively, an adjusted beam characteristic such as a radiance profile and/or divergence profile may be conserved or further adjusted as it is routed by the second fiber through a fiber-to-fiber coupler (FFC) and/or fiber-to-fiber switch (FFS) and to a process fiber, which delivers the beam to the process head or the work piece.

Figure 26:
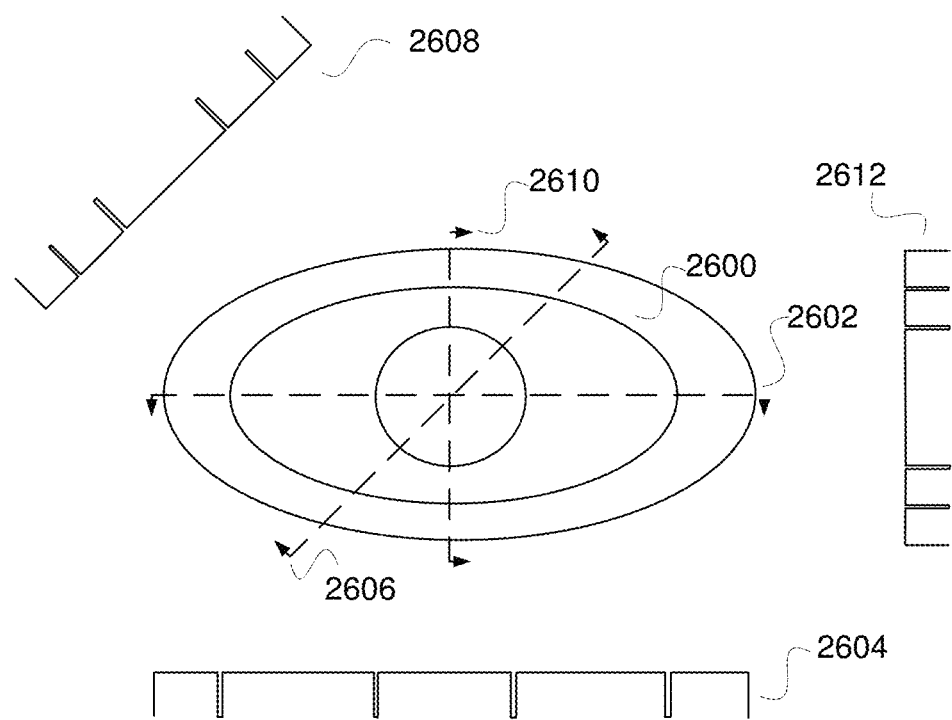
FIGS. 26-28 are cross-sectional views illustrating example second lengths of fiber ("confinement fibers") for confining adjusted beam characteristics in a fiber assembly.
Figure 27:
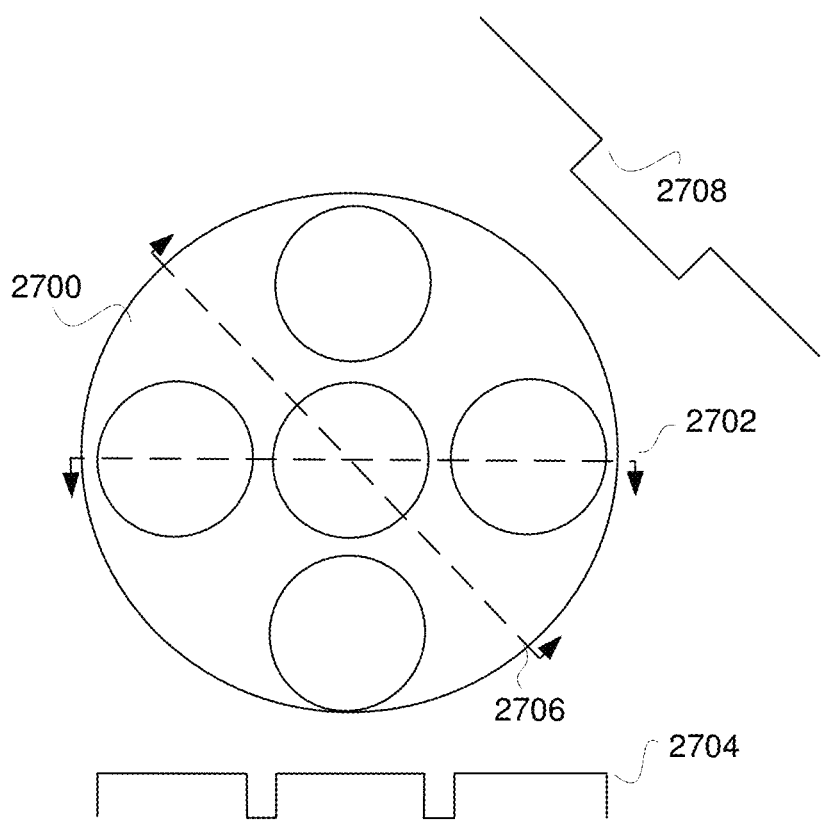
Figure 28:
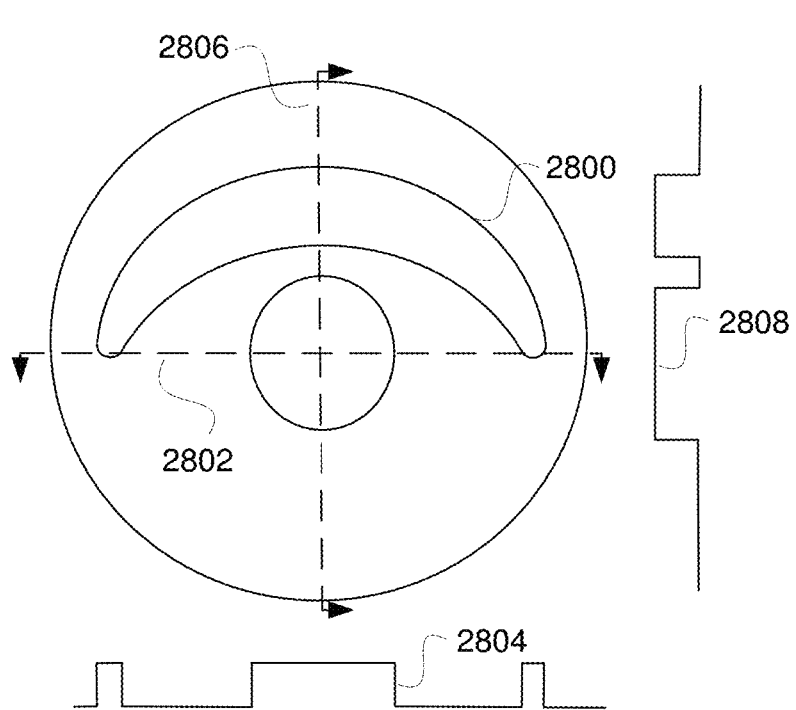

FIGS. 26-28 are cross-sectional views illustrating examples of fibers and fiber RIPs configured to enable maintenance and/or confinement of adjusted beam characteristics of a beam propagating in an azimuthally asymmetric second length of fiber wherein the beam characteristics are adjusted responsive to perturbation of a first length of fiber coupled to the second length of fiber and/or perturbation of the beam by a perturbation device 110. These azimuthally asymmetric designs are merely examples and are not an exhaustive recitation of the variety of fiber RIPs that may be used to enable maintenance and/or confinement of adjusted beam characteristics within an azimuthally asymmetric fiber. Thus, claimed subject matter is not limited to the examples provided herein. Moreover, any of a variety of first lengths of fiber (e.g., like those described above) may be combined with any azimuthally asymmetric second length of fiber (e.g., like those described in FIGS. 26-28).

FIG. 26 illustrates RIPs at various azimuthal angles of a cross-section through an elliptical fiber 2600. At a first azimuthal angle 2602, fiber 2600 has a first RIP 2604. At a second azimuthal angle 2606 that is rotated 45° from first azimuthal angle 2602, fiber 2600 has a second RIP 2608. At a third azimuthal angle 2610 that is rotated another 45° from second azimuthal angle 2606, fiber 2600 has a third RIP 2612. First, second and third RIPs 2604, 2608 and 2612 are all different.

FIG. 27 illustrates RIPs at various azimuthal angles of a cross-section through a multicore fiber 2700. At a first azimuthal angle 2702, fiber 2700 has a first RIP 2704. At a second azimuthal angle 2706, fiber 2700 has a second RIP 2708. First and second RIPs 2704 and 2708 are different. In an example, perturbation device 110 may act in multiple planes in order to launch the adjusted beam into different regions of an azimuthally asymmetric second fiber.

FIG. 28 illustrates RIPs at various azimuthal angles of a cross-section through a fiber 2800 having at least one crescent shaped core. In some cases, the corners of the crescent may be rounded, flattened, or otherwise shaped, which may minimize optical loss. At a first azimuthal angle 2802, fiber 2800 has a first RIP 2804. At a second azimuthal angle 2806, fiber 2800 has a second RIP 2808. First and second RIPs 2804 and 2808 are different.

Figure 22A:
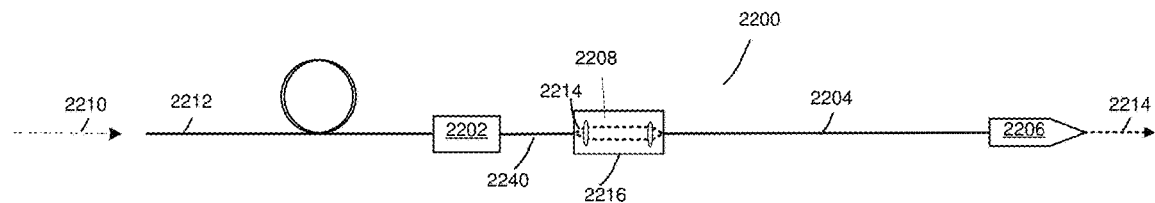
FIG. 22A illustrates an example laser system including a fiber assembly configured to provide variable beam characteristics disposed between a feeding fiber and process head.

FIG. 22A illustrates an example of a laser system 2200 including a VBC fiber assembly 2202 configured to provide variable beam characteristics. VBC fiber assembly 2202 comprises a first length of fiber 104, second length of fiber 108, and a perturbation device 110. VBC fiber assembly 2202 is disposed between feeding fiber 2212 (i.e., the output fiber from the laser source) and VBC delivery fiber 2240. VBC delivery fiber 2240 may comprise second length of fiber 108 or an extension of second length of fiber 108 that modifies, maintains, and/or confines adjusted beam characteristics. Beam 2210 is coupled into VBC fiber assembly 2202 via feeding fiber 2212. Fiber assembly 2202 is configured to vary the characteristics of beam 2210 in accordance with the various examples described above. The output of fiber assembly 2202 is adjusted beam 2214 which is coupled into VBC delivery fiber 2240. VBC delivery fiber 2240 delivers adjusted beam 2214 to free-space optics assembly 2208, which then couples beam 2214 into a process fiber 2204. Adjusted beam 2214 is then delivered to process head 2206 by process fiber 2204. The process head can include guided wave optics (such as fibers and fiber coupler), free space optics such as lenses, mirrors, optical filters, diffraction gratings), beam scan assemblies such as galvanometer scanners, polygonal mirror scanners, or other scanning systems that are used to shape the beam 2214 and deliver the shaped beam to a workpiece.

In laser system 2200, one or more of the free-space optics of assembly 2208 may be disposed in an FFC or other beam coupler 2216 to perform a variety of optical manipulations of an adjusted beam 2214 (represented in FIG. 22A with different dashing than beam 2210). For example, free-space optics assembly 2208 may preserve the adjusted beam characteristics of beam 2214. Process fiber 2204 may have the same RIP as VBC delivery fiber 2240. Thus, the adjusted beam characteristics of adjusted beam 2214 may be preserved all the way to process head 2206. Process fiber 2204 may comprise a RIP similar to any of the second lengths of fiber described above, including confinement regions.

FFCs can include one, two, or more lenses, but in typical examples, two lenses having the same nominal focal length are used, producing unit magnification. In most practical examples, magnification produced with an FFC is between 0.8 and 1.2, which corresponds to a ratio of focal lengths.

Figure 22B:
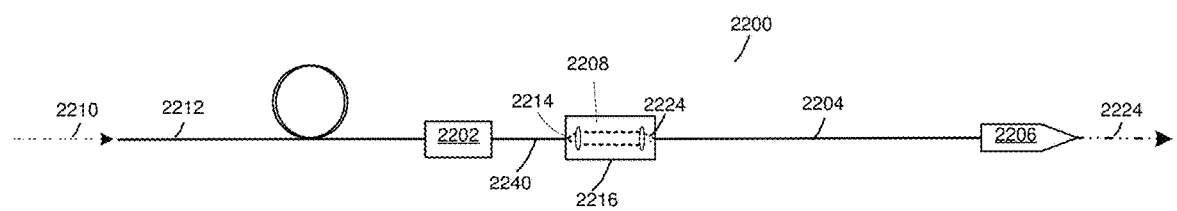
FIG. 22B illustrates an example a laser system including a fiber assembly configured to provide variable beam characteristics disposed between a feeding fiber and process head.

Alternatively, as illustrated in FIG. 22B, free-space optics assembly 2208 may change the adjusted beam characteristics of beam 2214 by, for example, increasing or decreasing the divergence and/or the spot size of beam 2214 (e.g., by magnifying or demagnifying beam 2214) and/or otherwise further modifying adjusted beam 2214. Furthermore, process fiber 2204 may have a different RIP than VBC delivery fiber 2240. Accordingly, the RIP of process fiber 2204 may be selected to preserve additional adjustment of adjusted beam 2214 made by the free-space optics of assembly 2208 to generate a twice adjusted beam 2224 (represented in FIG. 22B with different dashing than beam 2214).

Figure 23:
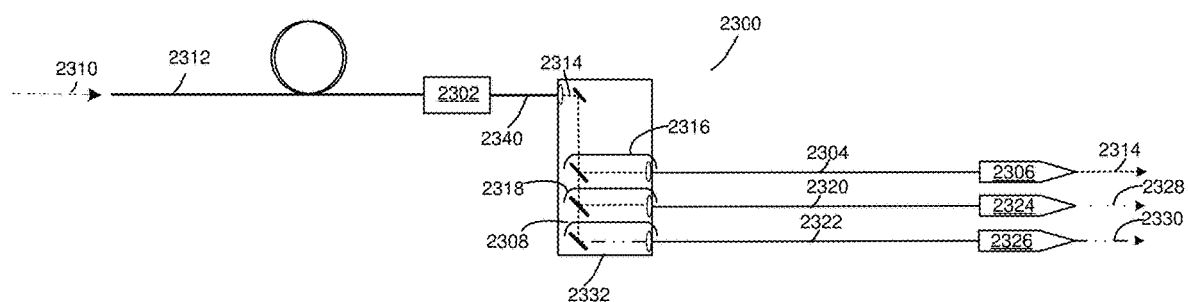
FIG. 23 illustrates an example laser system including a fiber assembly configured to provide variable beam characteristics disposed between a feeding fiber and multiple process fibers.

FIG. 23 illustrates an example of a laser system 2300 including VBC fiber assembly 2302 disposed between feeding fiber 2312 and VBC delivery fiber 2340. During operation, beam 2310 is coupled into VBC fiber assembly 2302 via feeding fiber 2312. Fiber assembly 2302 includes a first length of fiber 104, second length of fiber 108, and a perturbation device 110 and is configured to vary characteristics of beam 2310 in accordance with the various examples described above. Fiber assembly 2302 generates adjusted beam 2314 output by VBC delivery fiber 2340. VBC delivery fiber 2340 comprises a second length of fiber 108 of fiber for modifying, maintaining, and/or confining adjusted beam characteristics in a fiber assembly 2302 in accordance with the various examples described above (see FIGS. 17-21, for example). VBC delivery fiber 2340 couples adjusted beam 2314 into beam switch (FFS) 2332, which then couples its various output beams to one or more of multiple process fibers 2304, 2320, and 2322. Process fibers 2304, 2320, and 2322 deliver adjusted beams 2314, 2328, and 2330 to respective process heads 2306, 2324, and 2326.

In an example, beam switch 2332 includes one or more sets of free-space optics 2308, 2316, and 2318 configured to perform a variety of optical manipulations of adjusted beam 2314. Free-space optics 2308, 2316, and 2318 may preserve or vary adjusted beam characteristics of beam 2314. Thus, adjusted beam 2314 may be maintained by the free-space optics or adjusted further. Process fibers 2304, 2320, and 2322 may have the same or a different RIP as VBC delivery fiber 2340, depending on whether it is desirable to preserve or further modify a beam passing from the free-space optics assemblies 2308, 2316, and 2318 to respective process fibers 2304, 2320, and 2322. In other examples, one or more beam portions of beam 2310 are coupled to a workpiece without adjustment, or different beam portions are coupled to respective VBC fiber assemblies so that beam portions associated with a plurality of beam characteristics can be provided for simultaneous workpiece processing. Alternatively, beam 2310 can be switched to one or more of a set of VBC fiber assemblies.

Routing adjusted beam 2314 through any of free-space optics assemblies 2308, 2316, and 2318 enables delivery of a variety of additionally adjusted beams to process heads

2206, 2324, and 2326. Therefore, laser system 2300 provides additional degrees of freedom for varying the characteristics of a beam, as well as switching the beam between process heads ("time sharing") and/or delivering the beam to multiple process heads simultaneously ("power sharing").

For example, free-space optics in beam switch 2332 may direct adjusted beam 2314 to free-space optics assembly 2316 configured to preserve the adjusted characteristics of beam 2314. Process fiber 2304 may have the same RIP as VBC delivery fiber 2340. Thus, the beam delivered to process head 2306 will be a preserved adjusted beam 2314.

In another example, beam switch 2332 may direct adjusted beam 2314 to free-space optics assembly 2318 configured to preserve the adjusted characteristics of adjusted beam 2314. Process fiber 2320 may have a different RIP than VBC delivery fiber 2340 and may be configured with divergence altering structures as described with respect to FIGS. 20 and 21 to provide additional adjustments to the divergence distribution of beam 2314. Thus, the beam delivered to process head 2324 will be a twice adjusted beam 2328 having a different beam divergence profile than adjusted beam 2314.

Process fibers 2304, 2320, and/or 2322 may comprise a RIP similar to any of the second lengths of fiber described above, including confinement regions or a wide variety of other RIPs, and claimed subject matter is not limited in this regard.

In yet another example, free-space optics switch 2332 may direct adjusted beam 2314 to free-space optics assembly 2308 configured to change the beam characteristics of adjusted beam 2314. Process fiber 2322 may have a different RIP than VBC delivery fiber 2340 and may be configured to preserve (or alternatively further modify) the new further adjusted characteristics of beam 2314. Thus, the beam delivered to process head 2326 will be a twice adjusted beam 2330 having different beam characteristics (due to the adjusted divergence profile and/or intensity profile) than adjusted beam 2314.

In FIGS. 22A, 22B, and 23, the optics in the FFC or FFS may adjust the spatial profile and/or divergence profile by magnifying or demagnifying the beam 2214 before launching into the process fiber. They may also adjust the spatial profile and/or divergence profile via other optical transformations. They may also adjust the launch position into the process fiber. These methods may be used alone or in combination.

FIGS. 22A, 22B, and 23 merely provide examples of combinations of adjustments to beam characteristics using free-space optics and various combinations of fiber RIPs to preserve or modify adjusted beams 2214 and 2314. The examples provided above are not exhaustive and are meant for illustrative purposes only. Thus, claimed subject matter is not limited in this regard.

Figure 24:
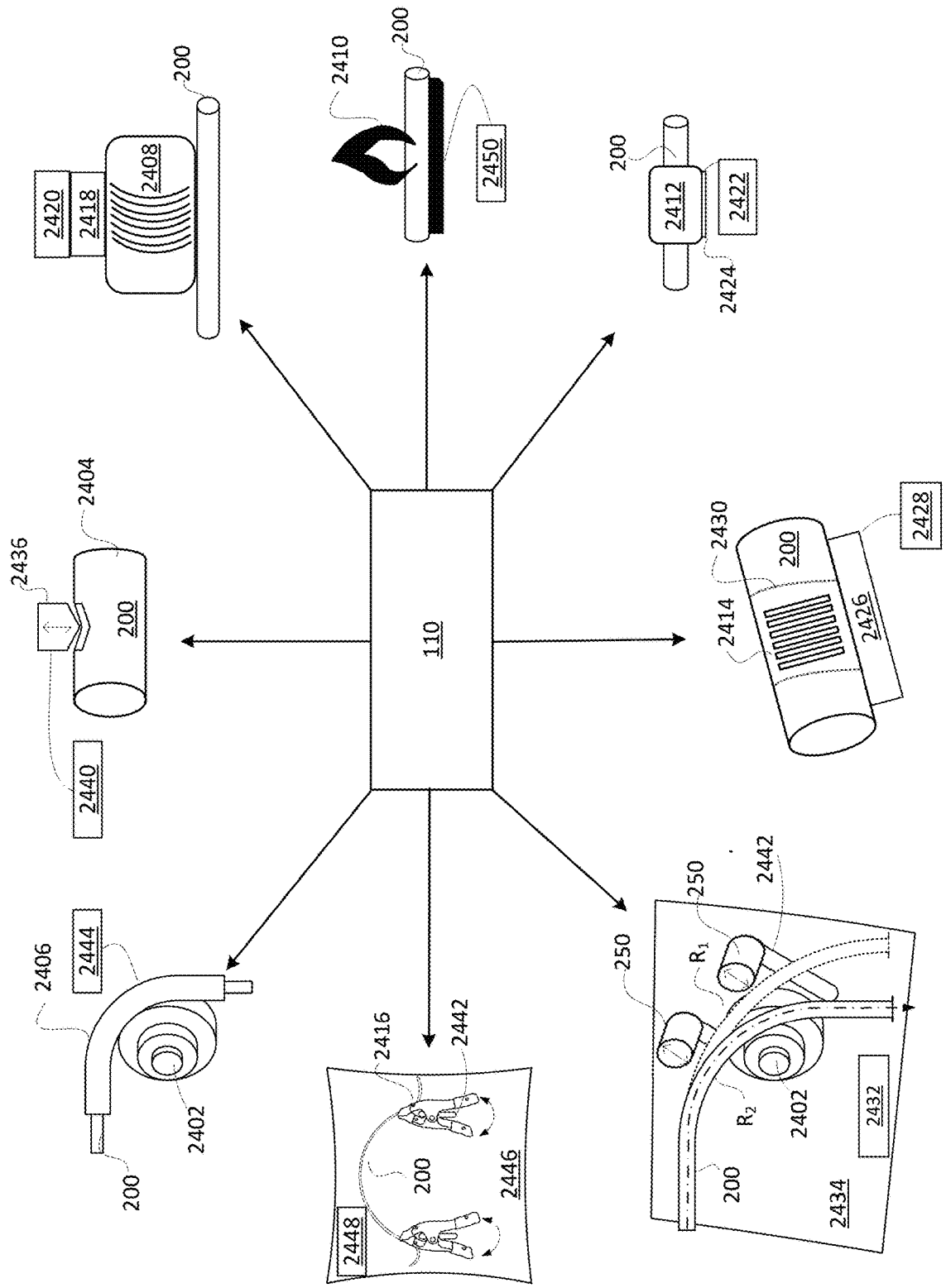
FIG. 24 illustrates examples of various perturbation assemblies for providing variable beam characteristics according to various examples provided herein.

FIG. 24 illustrates various examples of perturbation devices, assemblies or methods (for simplicity referred to collectively herein as "perturbation device 110") for perturbing a VBC fiber 200 and/or an optical beam propagating in VBC fiber 200 according to various examples provided herein. Perturbation device 110 may be any of a variety of devices, methods, and/or assemblies configured to enable adjustment of beam characteristics of a beam propagating in VBC fiber 200. In an example, perturbation device 110 may be a mandrel 2402, a micro-bend 2404 in the VBC fiber, flexible tubing 2406, an acousto-optic transducer 2408, a thermal device 2410, a piezo-electric device 2412, a grating 2414, a clamp 2416 (or other fastener), or the like, or any combination thereof. These are merely examples of perturbation devices 100 and not an exhaustive listing of perturbation devices 100 and claimed subject matter is not limited in this regard.

Mandrel 2402 may be used to perturb VBC fiber 200 by providing a form about which VBC fiber 200 may be bent. As discussed above, reducing the bend radius of VBC fiber 200 moves the intensity distribution of the beam radially outward. In some examples, mandrel 2402 may be stepped or conically shaped to provide discrete bend radii levels. Alternatively, mandrel 2402 may comprise a cone shape without steps to provide continuous bend radii for more granular control of the bend radius. The radius of curvature of mandrel 2402 may be constant (e.g., a cylindrical form) or non-constant (e.g., an oval-shaped form). Similarly, flexible tubing 2406, clamps 2416 (or other varieties of fasteners), or rollers 250 may be used to guide and control the bending of VBC fiber 200 about mandrel 2402. Furthermore, changing the length over which the fiber is bent at a particular bend radius also may modify the intensity distribution of the beam. VBC fiber 200 and mandrel 2402 may be configured to change the intensity distribution within the first fiber predictably (e.g., in proportion to the length over which the fiber is bent and/or the bend radius). Rollers 250 may move up and down along a track 2442 on platform 2434 to change the bend radius of VBC fiber 200.

Clamps 2416 (or other fasteners) may be used to guide and control the bending of VBC fiber 200 with or without a mandrel 2402. Clamps 2416 may move up and down along a track 2442 or platform 2446. Clamps 2416 may also swivel to change bend radius, tension, or direction of VBC fiber 200. Controller 2448 may control the movement of clamps 2416.

In another example, perturbation device 110 may be flexible tubing 2406 and may guide bending of VBC fiber 200 with or without a mandrel 2402. Flexible tubing 2406 may encase VBC fiber 200. Tubing 2406 may be made of a variety of materials and may be manipulated using piezo-electric transducers controlled by controller 2444. In another example, clamps or other fasteners may be used to move flexible tubing 2406.

Micro-bend 2404 in VBC fiber is a local perturbation caused by lateral mechanical stress on the fiber. Micro-bending can cause mode coupling and/or transitions from one confinement region to another confinement region within a fiber, resulting in varied beam characteristics of the beam propagating in a VBC fiber 200. Mechanical stress may be applied by an actuator 2436 that is controlled by controller 2440. However, this is merely an example of a method for inducing mechanical stress in fiber 200 and claimed subject matter is not limited in this regard.

Acousto-optic transducer (AOT) 2408 may be used to induce perturbation of a beam propagating in the VBC fiber using an acoustic wave. The perturbation is caused by the modification of the refractive index of the fiber by the oscillating mechanical pressure of an acoustic wave. The period and strength of the acoustic wave are related to the acoustic wave frequency and amplitude, allowing dynamic control of the acoustic perturbation. Thus, a perturbation assembly 110 including AOT 2408 may be configured to vary the beam characteristics of a beam propagating in the fiber. In an example, piezo-electric transducer 2418 may create the acoustic wave and may be controlled by controller or driver 2420. The acoustic wave induced in AOT 2408 may be modulated to change and/or control the beam characteristics of the optical beam in VBC 200 in real-time.

However, this is merely an example of a method for creating and controlling an AOT 2408 and claimed subject matter is not limited in this regard.

Thermal device 2410 may be used to induce perturbation of a beam propagating in VBC fiber using heat. The perturbation is caused by the modification of the RIP of the fiber induced by heat. Perturbation may be dynamically controlled by controlling an amount of heat transferred to the fiber and the length over which the heat is applied. Thus, a perturbation assembly 110 including thermal device 2410 may be configured to vary a range of beam characteristics. Thermal device 2410 may be controlled by controller 2450.

Piezo-electric transducer 2412 may be used to induce perturbation of a beam propagating in a VBC fiber using piezoelectric action. The perturbation is caused by the modification of the RIP of the fiber induced by a piezoelectric material attached to the fiber. The piezoelectric material in the form of a jacket around the bare fiber may apply tension or compression to the fiber, modifying its refractive index via the resulting changes in density. Perturbation may be dynamically controlled by controlling a voltage to the piezo-electric device 2412. Thus, a perturbation assembly 110 including piezo-electric transducer 2412 may be configured to vary the beam characteristics over a particular range.

In an example, piezo-electric transducer 2412 may be configured to displace VBC fiber 200 in a variety of directions (e.g., axially, radially, and/or laterally) depending on a variety of factors, including how the piezo-electric transducer 2412 is attached to VBC fiber 200, the direction of the polarization of the piezo-electric materials, the applied voltage, etc. Additionally, bending of VBC fiber 200 is possible using the piezo-electric transducer 2412. For example, driving a length of piezo-electric material having multiple segments comprising opposing electrodes can cause a piezo-electric transducer 2412 to bend in a lateral direction. Voltage applied to piezoelectric transducer 2412 by electrode 2424 may be controlled by controller 2422 to control displacement of VBC fiber 200. Displacement may be modulated to change and/or control the beam characteristics of the optical beam in VBC 200 in real-time. However, this is merely an example of a method of controlling displacement of a VBC fiber 200 using a piezo-electric transducer 2412 and claimed subject matter is not limited in this regard.

Gratings 2414 may be used to induce perturbation of a beam propagating in a VBC fiber 200. A grating 2414 can be written into a fiber by inscribing a periodic variation of the refractive index into the core. Gratings 2414 such as fiber Bragg gratings can operate as optical filters or as reflectors. A long-period grating can induce transitions among co-propagating fiber modes. The radiance, intensity profile, and/or divergence profile of a beam comprised of one or more modes can thus be adjusted using a long-period grating to couple one or more of the original modes to one or more different modes having different radiance and/or divergence profiles. Adjustment is achieved by varying the periodicity or amplitude of the refractive index grating. Methods such as varying the temperature, bend radius, and/or length (e.g., stretching) of the fiber Bragg grating can be used for such adjustment. VBC fiber 200 having gratings 2414 may be coupled to stage 2426. Stage 2426 may be configured to execute any of a variety of functions and may be controlled by controller 2428. For example, stage 2426 may be coupled to VBC fiber 200 with fasteners 2430 and may be configured to stretch and/or bend VBC fiber 200 using fasteners 2430 for leverage. Stage 2426 may have an embedded thermal device and may change the temperature of VBC fiber 200.

FIG. 25 illustrates an example process 2500 for adjusting and/or maintaining beam characteristics within a fiber without the use of free-space optics to adjust the beam characteristics. In block 2502, a first length of fiber and/or an optical beam are perturbed to adjust one or more optical beam characteristics. Process 2500 moves to block 2504, where the optical beam is launched into a second length of fiber. Process 2500 moves to block 2506, where the optical beam having the adjusted beam characteristics is propagated in the second length of fiber. Process 2500 moves to block 2508, where at least a portion of the one or more beam characteristics of the optical beam are maintained within one or more confinement regions of the second length of fiber. The first and second lengths of fiber may be comprised of the same fiber, or they may be different fibers.

Figure 29A:
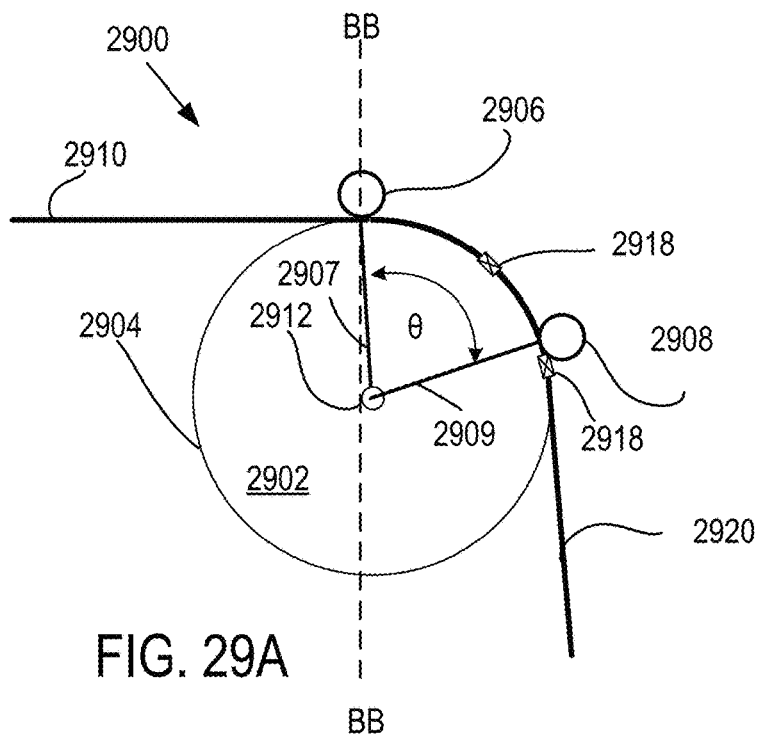
FIGS. 29A-29C illustrate a variable beam characteristics (VBC) apparatus that includes an optical fiber bending mechanism having rollers situated to push a selectable length of an optical fiber against a mandrel having a circular cross-section.
Figure 29B:
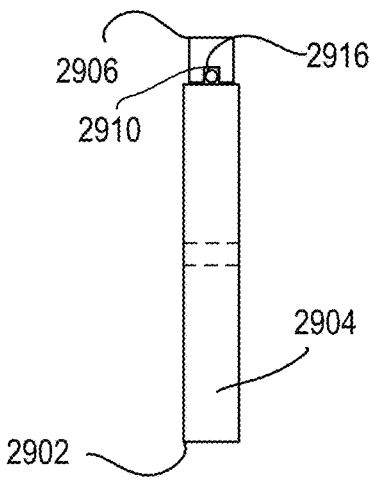
Figure 29C:
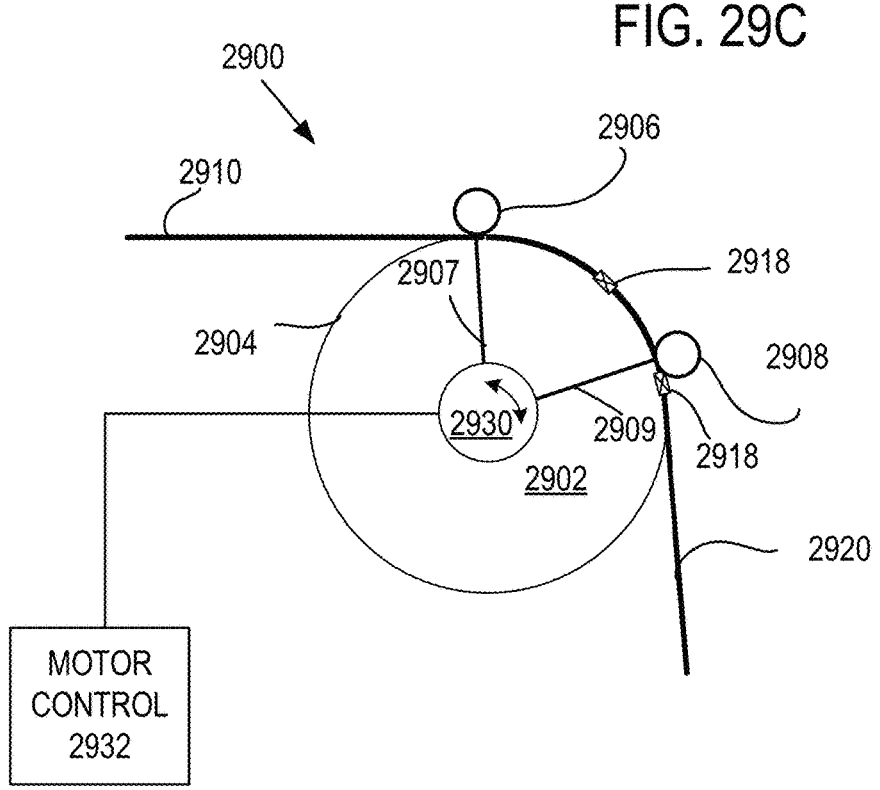

With reference to FIGS. 29A-29C, a variable beam characteristics (VBC) apparatus 2900 includes a disc 2902. The disc 2902 is a perturbation assembly having circular, elliptical, or other curved cross-section defining a perimeter surface 2904 that serves as a fiber bending or fiber shaping surface. Fiber guides 2906, 2908 are situated at the perimeter surface 2904 to urge a section of a first fiber 2910 toward the perimeter surface 2904. The fiber guides 2906, 2908 are secured to spokes 2907, 2909 that are connected to permit the fiber guides 2906, 2908 be rotatable about an axis 2912. A separation of the guides 2906, 2908 along the perimeter surface 2904 defines an angle θ that is associated with a length of a section of the first fiber 2910 that conforms to or is urged to contact the perimeter surface 2904. Rotation of one or both of the guides 2906, 2908 permits selection of a suitable length. In some examples, a fiber is secured to a guide such as the guide 2908, and rotation of the guide wraps a fiber about a fiber bending surface, thereby selecting a fiber length to be bent based on rotation of a guide. In such examples, a tension mechanism can be provided so that the fiber unwinds from a fiber bending surface as the guide rotates to unwrap the fiber.

The guides 2906, 2908 can include surfaces that press fibers toward the fiber bending surface. For example, the guides 2906, 2908 can be made of or include an elastic portion of rubber, foam, cloth, fibers, or other material than can be urged against a fiber without compromising fiber integrity and to accommodate sharp surface irregularities that could damage fibers. The fiber bending surface such as the perimeter surface 2904 can be provided with a similar material along the entire surface or only at portions expected to be used in conforming fibers. Alternatively, the guides 2906, 2908 can include grooves such as a groove 2916 that retains a fiber and may or may not press the fiber against the fiber bending surface. For guides that are rotatable, grooves may extend around the entire perimeter so that a fiber is retained in the groove as the guide rotates and travels along the fiber bending surface.

The first fiber 2910 is typically connected to a second fiber 2920 with a splice 2918 such as a fusion splice (shown in possible two locations in FIG. 29A). In some examples, a single fiber can be used, but generally two different fibers are used having different refractive index profiles. The guides 2906, 2908 then urge a section of the second fiber into a bent path along the perimeter surface 2904 (along with the splice 2918). In some examples, the spokes 2907, 2909 are rigid, but in other examples, elastic members such as springs can be used (or spokes can include an elastic portion) so that the guides 2906, 2908 are pulled toward the perimeter surface 2904. In many practical examples, only one guide is used, but one, two, three, or more can be used to select portions of one or more fibers to be conformed to the fiber bending surface 2904. For example, sections of the first fiber 2910 and the second fiber 2920 can be independently selected to be urged toward the perimeter surface using respective pairs of guides.

Locations of the guides 2906, 2908 can be controlled using motor 2930 that is coupled to the spokes 2907, 2909 to rotate to establish the angle θ. A controller 2932 is coupled to the motor 2930 so that the guides 2906, 2908 can be computer or processor controlled, or controlled manually. In some examples, the controller 2932 includes a non-transitory computer readable medium that includes a calibration table in which the angle θ and associated beam characteristics are stored. In systems having multiple guides, each can be arranged to be independently moved, and sections of one or more fibers can be selected.

In the example of FIGS. 29A-29C, a single bend radius is associated with a fiber bending surface, but in other examples, series of different bend radii can be used, each defined with a corresponding step formed as, for example, a portion of a cylinder, or on a tapered surface such as a cone or portion thereof. Arcuate or other curved surfaces can be used as well. Guides can be situated to direct fibers to a fiber bending or shaping surface having a particular curvature as well as selecting a length of fiber to be shaped into that curvature. Fiber sections can be bent at a plurality of surface areas having associated curvatures and section lengths can be varied for each curvature. Cylindrical curvatures are shown in FIGS. 29A-29C, but curvatures along multiple directions such as spherical or ellipsoidal curvatures can be used. The perimeter surface 2904 is an exterior surface of the disc 2902, but in other examples, interior surfaces of rings, hollow cylinders, or other shapes can be used as fiber bending or shaping surfaces, and guides situated to adjust fiber shape with respect to such interior surfaces.

In the disclosed examples, an optical fiber that includes a length of a first optical fiber and a second optical fiber that are fusion spliced is bent at or near the fusion splice so as to vary a spatial beam profile or other beam characteristic produced in the first fiber or the second fiber. More efficient adjustment of spatial beam profile is typically achieved if the fusion splice is included in the bent portion of the fiber. However, the fusion splice can be located sufficiently close to the bent portion. Typically, the fusion splice should be situated within a length of less than about 2, 5, 10, 50, 100, 500, or 1000 times a core diameter of either fiber. Sufficient fiber lengths can also depend on fiber numerical aperture as well. One possible explanation for the utility of bending either the first fiber or the second fiber is that bending of a fiber near a launch point, which is at the spliced junction 2918, can produce a variable spatial beam profile that propagates some distance before collapsing to an original beam shape. In a receiving (second) fiber, bending near a splice can perturb a spatial power distribution from the launching (first) fiber, and thus variably couple the received power into a selected spatial power distribution. The disclosure is not limited to operation in accordance with operation in this way, and this explanation is only provided as one potential explanation for convenience.

In FIG. 29A, the perturbation assembly disc 2902 is disposed proximal to the spliced junction 2918. Alternatively, a perturbation assembly may not be disposed near a splice. Moreover, a splice may not be needed at all, for example the fiber 2910 may be a single fiber, a first length of fiber and second length of fiber could be spaced apart, or secured with a small gap (air-spaced or filled with an optical material, such as optical cement or an index-matching material).

In some examples, the bend radius of a fiber is changed from a first bend radius $R_1$ to a second bend radius $R_2$ by using a stepped mandrel or a cone in a perturbation assembly. Fiber portions having different bend radii can be independently selected. Changing a bend radius of a fiber may change the radial beam position, divergence angle, and/or radiance profile, or other beam characteristics of a beam within the fiber.

Figure 30:
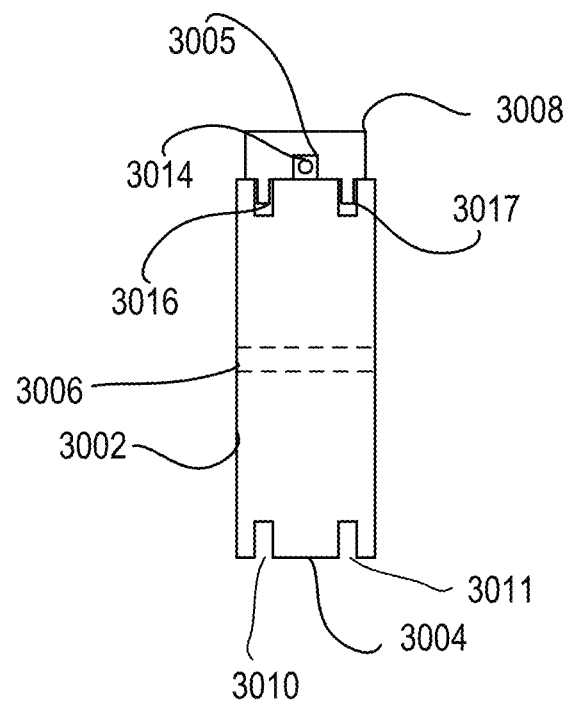
FIG. 30 illustrates a fiber bending mechanism that can accommodate multiple fiber loops.

In an example shown in a sectional view in FIG. 30, a disk 3002 defines a perimeter (fiber bending) surface 3004 that is provided with grooves 3010, 3011. Typically, the disk 3002 includes a central bore 3006 for insertion of a rotatable shaft (not shown). A guide 3008 includes protrusions 3016, 3017 that can be inserted in the grooves 3010, 3011 so that the guide 3008 is movable along the perimeter surface 3004. A fiber 3014 is shown situated in a groove 3015 in the guide 3008. In other examples, guides can have dovetail shaped protrusions to fit into correspond grooves in a disk or other support. Alternatively, grooves can be provided in the guide, and protrusions in the disk, or any combination thereof as may be convenient.

Figure 31:
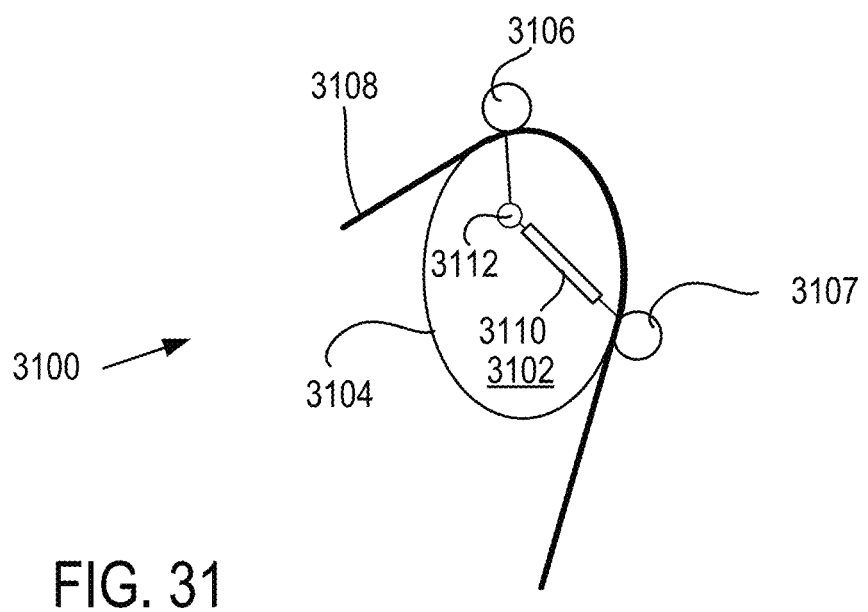
FIG. 31 illustrates VBC apparatus that includes rollers situated to push a selectable length of an optical fiber against a mandrel having an elliptical cross-section.

With reference to FIG. 31, a VBC apparatus 3100 includes an ellipsoidal disk 3102 having a perimeter (fiber bending) surface 3104. Guides 3106, 3107 are situated to select a length of a fiber 3108 that conforms to the fiber bending surface 3104. As shown, the guide 3106 is fixed with respect to the perimeter surface 3104, and the guide 3107 is configured to be movable along the perimeter surface 3104. In the example of FIG. 31, the guide 3107 is secured with an elastic member 3110 so as to be rotatable about an axis 3112. The perimeter surface 3104 is defined by an ellipse and thus has a varying radius of curvature, and the elastic member 3110 is selected to permit the guide 3107 to accommodate varying distances from the axis 3112 to the perimeter surface 3104.

FIG. 32 illustrates an additional fiber bending surface 3202 that is formed on a substrate 3200. A surface 3206 opposite the fiber bending surface 3202 can be planar, or have a convex or concave curvature. A guide 3208 is situated to urge a fiber against the fiber bending surface 3202, and one, two, three, or more such guides can be used. As discussed above, the guide 3208 can be retained by a groove and be slidable, or can be coupled to an elastic member that urges the guide 3208 toward the fiber bending surface 3202. The fiber bending surface 3202 can have various simple or complex curvatures, and can be convex, concave, or planar in at least some portions. The guide 3208 can be spherical or cylindrical and arranged to roll along the fiber bending surface 3204. In some examples, the guide 3208 is situated to urge a fiber 3210 to contact the fiber bending surface 3202, to change a bend angle of the fiber 3210, or bend the fiber 3210 while leaving a gap 3212 between the fiber 3210 and the fiber bending surface 3202 proximate the guide 3208.

Referring to FIGS. 33A-33B, a guide 3304 is situated to urge a fiber 3306 toward a fiber bending surface 3308. The fiber 3306 can be secured with respect to the fiber bending surface 3308 with a clip 3310 or otherwise fixed so that a length of fiber conformed to the fiber bending surface 3208 is determined by a position of the guide 3304. As shown in the sectional view of FIG. 33B, the fiber 3306 is retained in a channel 3312, and the guide 3304 includes protrusions 3320, 3321 that correspond to grooves 3330, 3331 in the fiber bending surface 3308.

With reference to FIG. 34, a section 3402 of a disk defines a fiber bending surface 3404. A clamp 3406 secures a fiber 3408 to the fiber bending surface 3404 and a guide 3410 is movable along the fiber bending surface 3404 to control a fiber length that is urged toward the fiber bending surface 3404. The guide 3410 can move along the surface in grooves and/or be secured to an axis that permits rotation. As shown in FIG. 35, a portion 3502 of ring defines a fiber bending surface 3504. A clamp 3506 and a guide 3510 are provided to adjust a fiber length that is conformed to the fiber bending surface 3504. The guide 3510 can be slidable along the fiber bending surface 3504 in grooves or otherwise, or coupled to a spoke to rotate along an axis. In some examples, a fiber bending surface is rotatable or otherwise adjustable so that a separation of a clamp fixed with respect to the fiber bending surface and a guide is adjustable. For example, as shown in FIG. 35, a spoke 3512 can permit movement of the guide 3510 along the fiber bending surface 3504 and/or a spoke 3514 can be coupled to permit rotation of the ring 3502 with respect to the guide 3510. Such rotation or movement of a fiber bending surface can be accomplished by rotation of a disk, cylinder, or other shape that defines the fiber bending surface.

Figure 36:
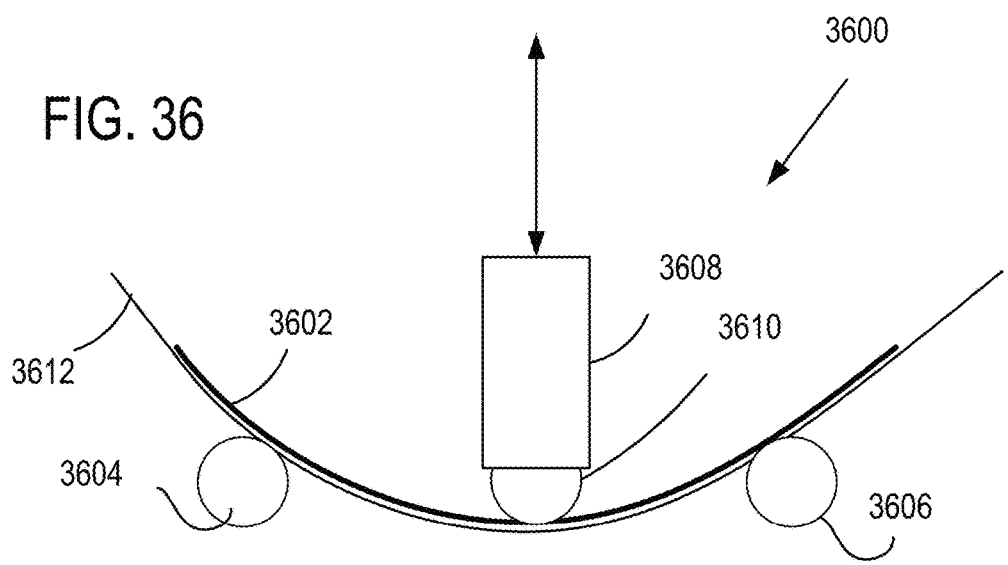
FIG. 36 illustrates a VBC apparatus that includes a flexure to which an optical fiber is secured.

As shown in FIG. 36, a VBC apparatus 3600 includes a flexible plate 3602 that is situated to be flexed against fixed supports 3604, 3606 by a linear actuator 3608 that urges a bearing 3610 toward the flexible plate 3602. A fiber 3612 is secured to the flexible plate 3602 or otherwise situated so as to bend in response to flexing of the flexible plate 3602.

Figure 37A:
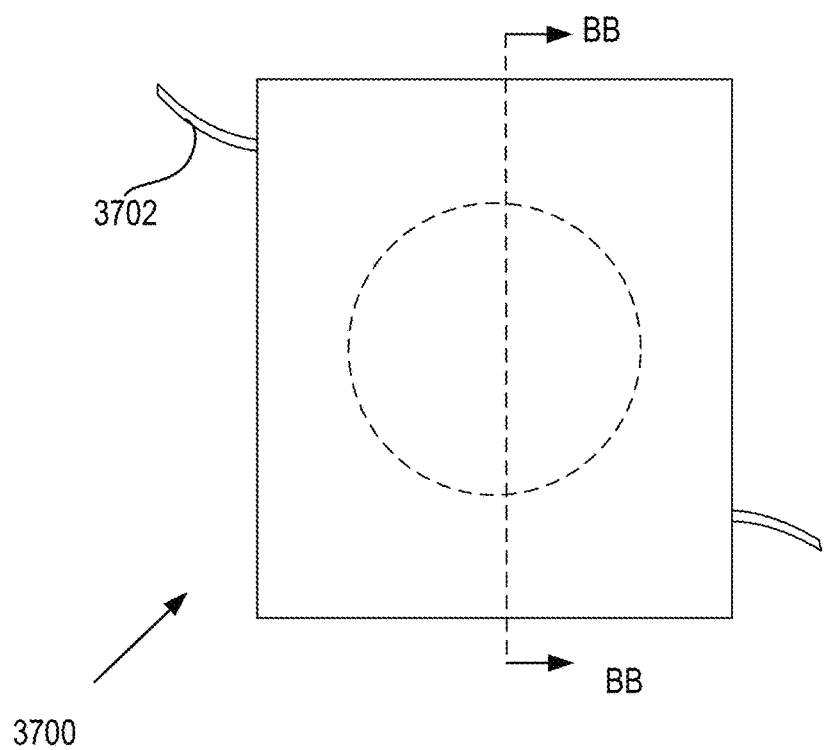
FIGS. 37A-37B illustrates a fiber bending mechanism that varies a length of fiber that is bent.
Figure 37B:
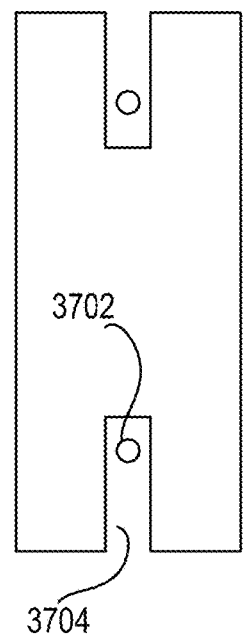

FIGS. 37A-37B illustrate a spool 3700 that includes a groove or channel 3704 that is configured to retain one or more loops of a fiber 3702. Rotation of the spool 3700 (or the fiber about the spool 3700) permits adjustment of a beam perturbation applied by the fiber 3702. Other arrangements can be provided that permit varying a number of wraps of a fiber on a substrate, and typically a section of a cylinder can suffice. A controller is generally provided to select a number of wraps (turns) by controlling a stepper motor or other motor, but in some examples, the number of turns can be adjusted manually. While it may be convenient that the fiber 3702 contact a radially innermost portion of the groove 3704, this is not required.

With reference to FIGS. 38A-38B, a VBC device 3800 includes a cylinder 3804 that is situated to press a fiber loop 3802 towards a first jaw 3806 and a second jaw 3808 in response to translation of a rod 3812 that is secured to the cylinder 3804. One or more springs such as representative spring 3810 are situated to urge one or both of the jaws 3806, 3808 toward the fiber 3802 and the cylinder 3804. FIG. 38A shows the fiber loop 3802 without deformation for convenient illustration; with the configuration of FIG. 38B, substantial bending of the fiber loop 3802 would be obtained. Various shapes can be used to press the fiber loop 3802 such as cylindrical, spherical, ellipsoidal, arcuate, or other shapes, and a cylinder is shown for convenient illustration.

FIGS. 39A-39D illustrate fiber shape with various engagements of the mechanism of FIGS. 38A-38B. In FIG. 39A, a fiber remains in a loop 3900 without bending or deformation. FIGS. 39B-39C show fiber sections 3902, 3904, 3906 that contact the jaws 3806, 3808 and the cylinder 3804 as engagement of the mechanism is increased. The shape of the loop 3900 changes as well.

Figure 40:
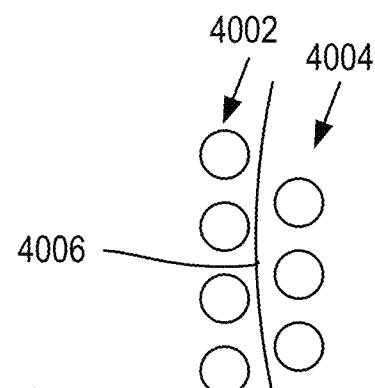
FIG. 40 illustrates another representative VBC apparatus that include oppositely situated sets of cylinders that can contact a fiber.

FIG. 40 illustrates a VBC apparatus 4000 for perturbing beam characteristics that includes a first set 4002 and a second set 4004 of cylinders or other suitable shapes that are situated opposite each other. A fiber 4008 is situated between the first set 4002 and the second set 4004 so as to be bent or deformed as the first set 4002 and the second set 3004 are urged toward each other. In FIG. 40, cylinders of the same shape are shown, but one or more of the cylinders of either set can have different diameters, and different shapes can be used for each surface of each set.

Figure 41:
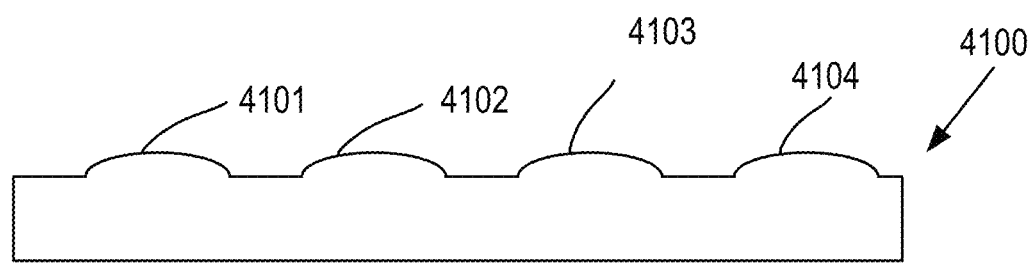
FIG. 41 illustrates a representative fiber shaping surface formed with a plurality of oppositely situated cylinders.

A plurality of fiber shaping surfaces can be defined on a single substrate, if convenient, as shown in FIG. 41. A plate 4100 includes elliptical or other protrusions 4101, 4102, 4103, 4104 that provide fiber shaping surfaces. Cylindrical, arcuate, spherical, parabolic, or other shapes can be used.

FIG. 42 illustrates a VBC apparatus 4200 that is similar to that of FIG. 36 but in which a flexible plate 4202 is pulled against stops 4204, 4206 with a linear actuator 4208 that is coupled to the flexible plate 4202 with an elastic or rigid coupling 4210. A fiber 4212 is situated to conform to a shape of the flexible plate 4202.

In a further example shown in FIGS. 43A-43B, a beam perturbation mechanism 4300 includes a cylinder 4304 having a central bore 4306 that can accommodate a drive shaft. An outer surface 4305 of the cylinder 4304 serves as a fiber shaping surface. In FIG. 43B, a fiber 4302 is shown as having been wrapped about the cylinder 4304 several times. Rotation of the cylinder 4304 can be used to provide a selected beam perturbation, either manually, or with a processor-based control system that can store beam perturbation characteristics as a function of rotation angle in one or more non-transitory computer-readable media.

Figure 44A:
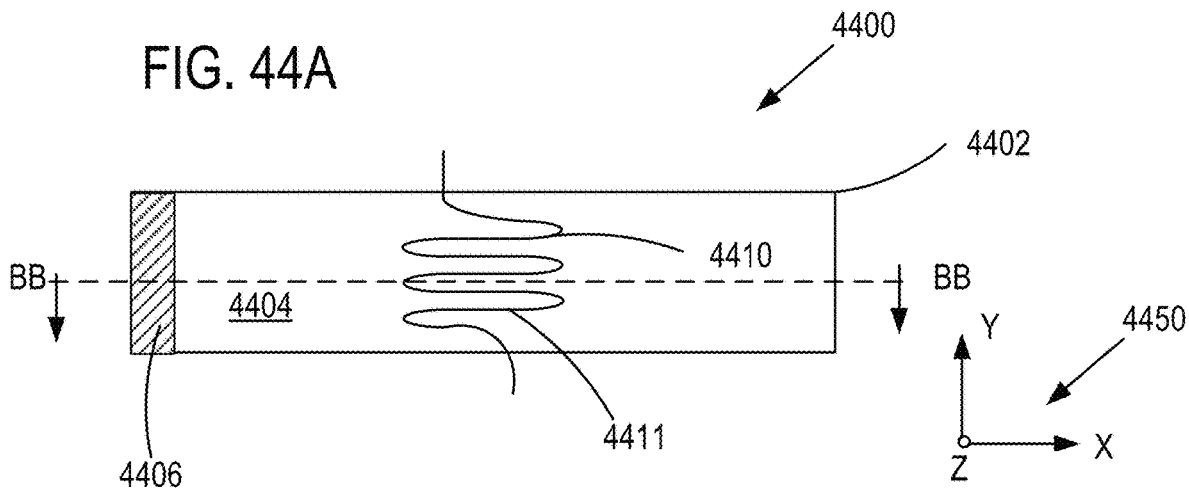
FIGS. 44A-44B illustrate a VBC device that includes an ionic polymer composite (IPC).
Figure 44B:
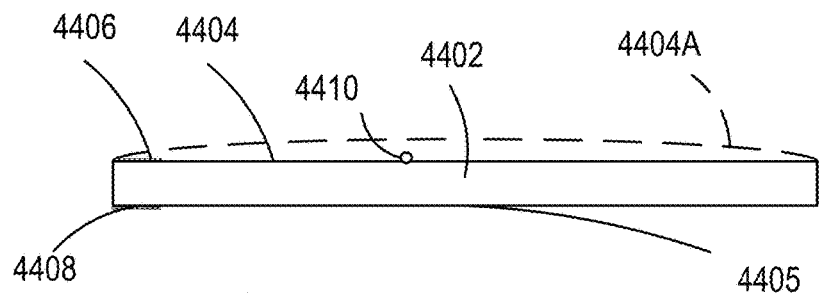

FIGS. 44A-44B illustrate a VBC device 4400 that includes a substrate 4402 formed at least in part of an ionic polymer composite (IPC) and having a first major surface 4404 and second major surface 4405. Electrodes 4406, 4408 are situated on or at the first major surface 4404 and the second major surface 4405, respectively. In some cases there are intervening layers such as non-conductive layers, protective layers, or other layers needed for fabrication or use, but such layers are not shown. A serpentine fiber loop 4410 is secured to the first major surface 4404 and is shaped to have elongated portions such as elongated portion 4411 that extends along an X-axis of a right handed Cartesian coordinate system 4450. As shown in the sectional view of FIG. 44B, application of an electric field to the substrate 4402 in response to a voltage applied to the electrodes 4406, 4408 produces a Z-directed deformation so that the first major surface 4404 is bowed or bent as surface 4404A; such deformation produces beam perturbations in the fiber loop 4410. Other deformations in other directions can be produced, and straight fiber lengths, circular loops, partial loops, serpentine lengths, and other arrangements of fibers can be oriented on either the first major surface 4404 or the second major surface 4405 along the X-direction, the Y-direction, or arbitrarily oriented.

Figure 45:
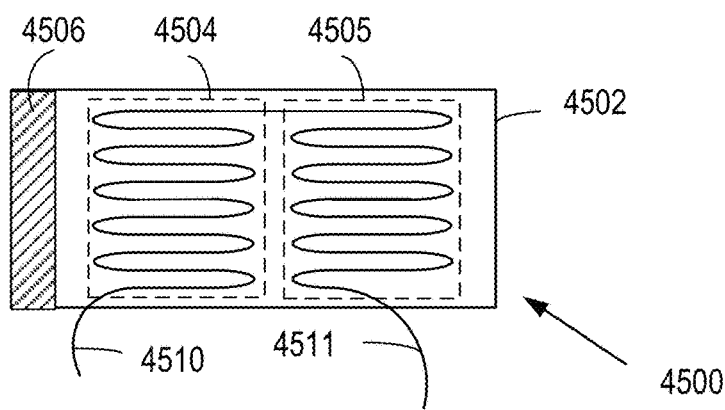
FIG. 45 illustrates illustrate another VBC device that includes an IPC.

In another example illustrated in FIG. 45, a VBC device 4500 includes an IPC substrate 4502 to which fiber serpentine loops 4504, 4505 (or circular loops or fibers arranged in other shapes) are secured so as to be subject to flexing of the IPC substrate 4502. Electrodes such as electrode 4506 are provided at ends of the IPC substrate 4502, but can be situated in other portions or cover the substrate 4502. Fiber ends 4510, 4511 can be used to couple optical beams into and out of the beam perturbation device 4500. As in other examples discussed above, the fiber serpentine loops 4504, 4505 can be of a single fiber (a first fiber) or a first fiber and a second fiber with a splice.

Figure 46:
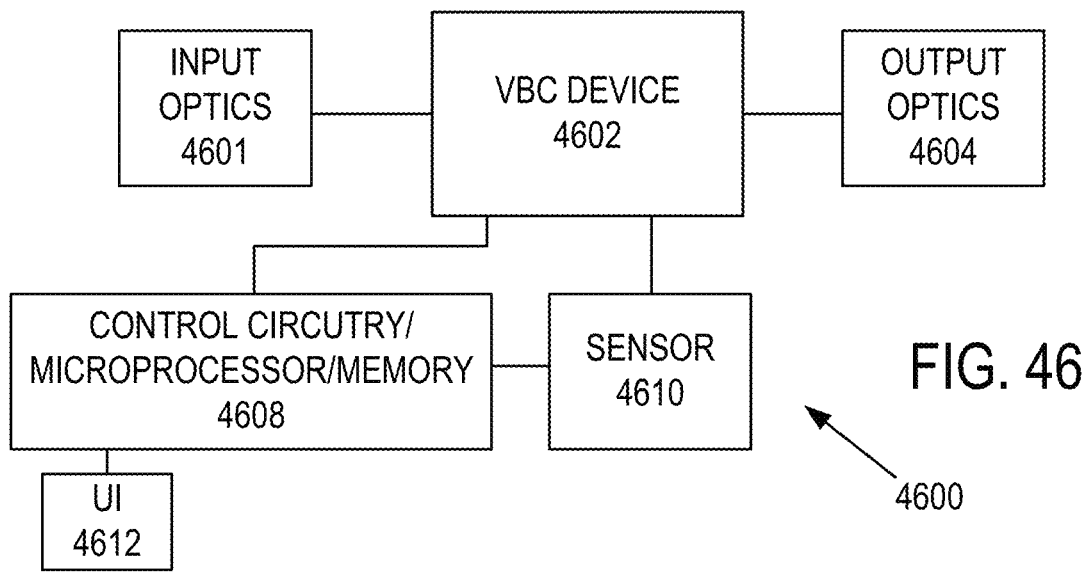
FIG. 46 illustrates a representative VBC system.

FIG. 46 illustrates a VBC system 4600 that includes input optics 4601 that couple one or more beams to a beam perturbation device 4602 and output optics 4604 which receive one or more perturbed beams for delivery to a substrate, or for other use. A control system 4608 can include control circuits, processors such as microprocessors or other programmable logic devices, memory such as RAM or ROM that stores processor-executable instructions for control of the beam perturbation device 4602 including, for example, one or more calibration tables containing beam perturbations as functions of beam perturbation device drive level. In some cases, the beam perturbation device 4602 can include one or more actuators or motors such as linear or stepper motors, piezoelectric stages, piezoelectric actuators, piezobending motors, bi-metallic strips (with thermal control), rotary motors, or voice coil motors. Alternatively, the control system can include a digital to analog convertor (DAC) for setting drive levels to the beam perturbation device. For example, IPC-based beam perturbation devices are responsive to applied voltages that can be provided by a DAC. A user interface (UI) 4612 is typically provided that can include one or more computer input or pointing devices such as a mouse, trackpad, keyboard, or touchscreen for setting, adjusting, and recording and storing beam perturbation values. In some cases, control is via remote network connection and the control system 4608 includes a wired or wireless network interface. The UI 4612 can also include switches, potentiometers, and other devices for use in controlling the beam perturbation device 4602. In some examples, the beam perturbation device 4602 includes a control system.

In some examples, a sensor 4610 is situated to determine beam perturbation or a condition of the beam perturbation device. The sensor 4610 is coupled to the control system 4608 to correct errors and drifts in beam perturbations, and/or to verify that the beam perturbation device is operating as intended. For example, VBC apparatus that include an ionic polymer layer can be provided with one or more additional electrodes that are coupled to an amplifier or other circuit to produce a signal indicative of layer deformation. This signal can be used to stabilize ionic polymer deformation. In other VBC apparatus, position, rotation, distance or other sensors can be included so that perturbations produced by a perturbation device can be detected and controlled to maintain a selected perturbation.

Figure 47A:
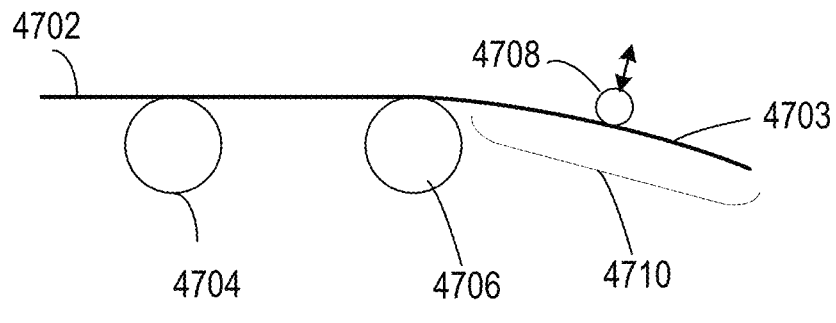
FIGS. 47A-47C illustrate additional representative VBC apparatus.

FIG. 47A illustrates a VBC apparatus 4700 in which a fiber 4702 is secured to or guided by supports 4704, 4706. A fiber deflection member 4708 (shown for purposes of illustration as having a circular cross-section) is situated to deflect an end portion 4703 of the fiber 4702. The end portion 4703 can include a splice region 4704 in which a first fiber and a second fiber are spliced. The fiber deflection member 4708 is situated to push against the fiber 4702 to increase fiber deflection and pull the fiber to decrease fiber deflection, but can be situated to push to decrease deflection and pull to increase deflection.

Figure 47B:
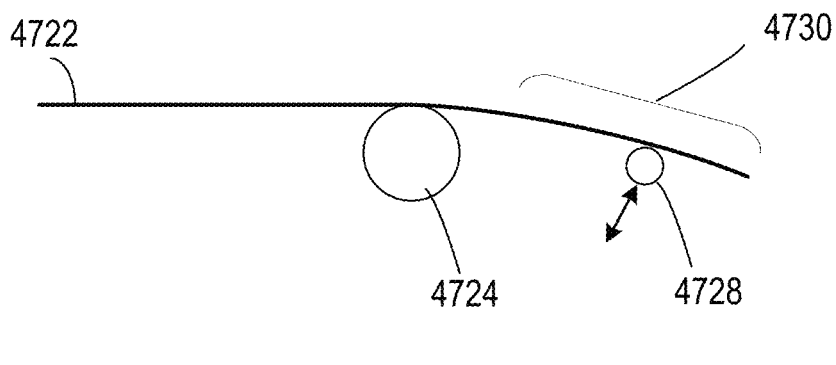

In another example shown in FIG. 47B, a VBC apparatus 4720 includes a fiber 4722 that is in contact with, secured to, or otherwise restrained by a support 4724. A fiber deflection member 4728 is situated to deflect the fiber 4722 at a location at, near, or in a splice region 4730 in which a first fiber portion and a second fiber portion are spliced together. The fiber deflection members 4708, 4728 can have various shapes and sizes and can be coupled to piezoelectric devices, linear motors, or other actuators that provide displacement.

Figure 47C:
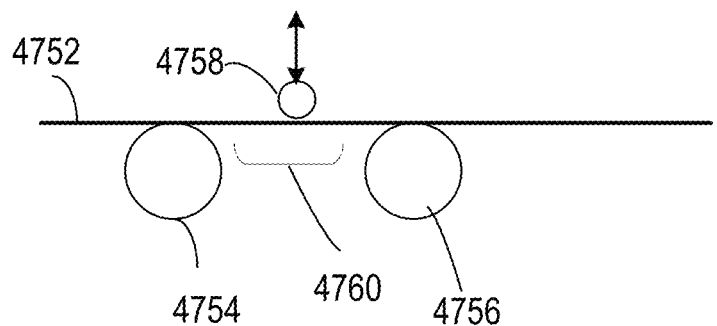

In another example shown in FIG. 47C, a VBC apparatus 4750 includes a fiber 4752 that is in contact with, secured to, or otherwise restrained by supports 4754, 4756. A fiber deflection member 4758 is situated to deflect the fiber 4752 at a location at, near, or in a splice region 4760 in which a first fiber portion and a second fiber portion are spliced together.

The VBC apparatus 4700, 4720, 4750 do not include a fiber bending surface. Such a surface is convenient is some embodiments as shown above, but is not required. In the examples of FIGS. 47A-47C, fiber deflections are used. The fiber deflection members 4708, 4728, 4758 can have various shapes and sizes and can be coupled to piezoelectric devices, linear motors, or other actuators to provide displacements.

Having described and illustrated the principles of the disclosed technology with reference to the illustrated embodiments, it will be recognized that the illustrated embodiments can be modified in arrangement and detail without departing from such principles. The particular arrangements above are provided for convenient illustration, and other arrangements can be used.

We claim:

1. An apparatus, comprising: a first length of fiber situated to receive an input optical beam, the first length of fiber having a first refractive index profile; a perturbation assembly coupled to the first length of fiber or integral with the first length of fiber; a bend controller to tune delivery of a laser to a workpiece, the bend controller coupled to the perturbation assembly, the bend controller powered by, or comprising, a power source and arranged to identify, in real time, a beam perturbation device drive level corresponding to a bend amount from a set of two or more predefined bend amounts; a memory storing a calibration table in which two or more different beam characteristics are correlated with the two or more predefined bend amounts, respectively, wherein the apparatus further comprises a second length of fiber having a second refractive index selected to maintain any selected beam characteristic from the two or more different beam characteristics; the bend controller situated to apply a bend to at least a section of the first length of fiber to perturb the input optical beam and produce a modified optical beam in real-time, by operating the perturbation assembly based on the identified beam perturbation device drive level, wherein the bend controller is further configured to: receive information about a demanded laser attribute for the tuning the delivery of the laser to the workpiece; and perform a look-up from the calibration table based on the information about the demanded laser attribute, wherein the beam perturbation device drive level is identified based on the look-up from the calibration table; and the second length of fiber situated to receive the modified optical beam and maintain at least one beam characteristic of the modified optical beam.

2. The apparatus of claim 1, wherein a section of the first length of fiber extends from a fiber support.

3. The apparatus of claim 1, wherein a section of the first length of fiber is situated between a first fiber support and a second fiber support.

4. The apparatus of claim 1, wherein the first refractive index profile comprises a graded-index.

5. The apparatus of claim 1, wherein the power source comprises an electrical voltage source.

6. The apparatus of claim 1, wherein the bend controller comprises:
means for urging the first length of fiber toward a fiber shaping surface.

7. The apparatus of claim 1, wherein the bend controller comprises:
means for displacing a core of the first length of fiber from a fiber axis.

8. The apparatus of claim 1, wherein the bend controller comprises an application specific integrated circuit, or general purpose microprocessor configured to execute instructions stored in a memory for controlling the perturbation assembly based on the demanded laser attribute for the tuning the delivery of the laser to the workpiece.

9. An apparatus, comprising: a first length of fiber situated to receive an input optical beam, the first length of fiber having a first refractive index profile; a perturbation assembly coupled to the first length of fiber or integral with the first length of fiber; a memory storing a calibration table in which different beam characteristics are correlated with different fiber perturbation values, wherein the apparatus further comprises a second length of fiber having a second refractive index selected to maintain any selected beam characteristic from the beam characteristics; means for variably controlling delivery of a laser to a workpiece, the variable controlling means arranged to generate a control signal to send to the perturbation assembly, the generated control signal 1) based on information about a demanded laser attribute for the delivery of the laser to the workpiece and 2) corresponding to a bend amount from a set of two or more predefined bend amounts, wherein the variably controlling means is further configured to perform a look-up from the calibration table based on the information about the demanded laser attribute, wherein the control signal is generated based on the look-up from the calibration table; wherein the perturbation assembly is configured to modulate a displacement applied to the first length of fiber based on the generated control signal; the second length of fiber situated to receive a modified optical beam generated by operation of the perturbation assembly based on the generated control signal, the second length of fiber having a second refractive index profile selected to maintain at least one beam characteristic of the modified optical beam.

10. The apparatus of claim 9, wherein a section of the first length of fiber extends from a fiber support.

11. The apparatus of claim 9, wherein a section of the first length of fiber is situated between a first fiber support and a second fiber support.

12. The apparatus of claim 9, wherein the first refractive index profile comprises a graded-index.

13. The apparatus of claim 9, wherein the power source comprises an electrical voltage source.

14. The apparatus of claim 9, wherein the perturbation assembly comprises:
means for urging the first length of fiber toward a fiber shaping surface that is arranged to provide a continuous bend radii.

15. The apparatus of claim 9, wherein the perturbation assembly comprises:
means for displacing a core of the first length of fiber from a fiber axis.

16. The apparatus of claim 9, wherein the controlling means comprises an application specific integrated circuit, or a general purpose microprocessor configured to execute instructions stored in a memory for generating the control signal.

17. The apparatus of claim 1, wherein the input optical beam received by the first length of fiber comprises a high power input optical beam and the modified optical beam received by the second length of fiber comprises a high power modified optical beam, and wherein the laser comprises a high power laser to deliver optical power to the workpiece for laser-processing the workpiece.

18. The apparatus of claim 17, further comprising a free-space optics assembly operably coupled between the first and second lengths of fiber.

19. The apparatus of claim 18, wherein the free-space optics assembly is configured to modify at least one additional beam characteristic that is different than the at least one beam characteristic.

20. The apparatus of claim 1, wherein the two or more predefined bend amounts define a range of bend lengths.

21. The apparatus of claim 20, wherein the two or more predefined bend amounts define 1) the range of bend lengths and 2) a range of bend radii.

* * * * *